(12) United States Patent
Wang et al.

(10) Patent No.: US 11,983,207 B2
(45) Date of Patent: May 14, 2024

(54) METHOD, ELECTRONIC DEVICE, AND COMPUTER PROGRAM PRODUCT FOR INFORMATION PROCESSING

(71) Applicant: EMC IP Holding Company LLC, Hopkinton, MA (US)

(72) Inventors: Zijia Wang, Shanghai (CN); Jiacheng Ni, Shanghai (CN); Zhen Jia, Shanghai (CN); Bo Wei, Shanghai (CN); Chun Xi Chen, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 171 days.

(21) Appl. No.: 17/146,558

(22) Filed: Jan. 12, 2021

(65) Prior Publication Data

US 2022/0171798 A1 Jun. 2, 2022

(30) Foreign Application Priority Data

Nov. 30, 2020 (CN) .......................... 202011375820.0

(51) Int. Cl.
*G06F 16/33* (2019.01)
*G06F 16/35* (2019.01)
(Continued)

(52) U.S. Cl.
CPC ...... *G06F 16/3346* (2019.01); *G06F 16/3344* (2019.01); *G06F 16/353* (2019.01); *G06N 5/04* (2013.01); *G06N 20/00* (2019.01)

(58) Field of Classification Search
CPC .............. G06F 16/3346; G06F 16/353; G06F 16/3344; G06N 20/00; G06N 5/04
(Continued)

(56) References Cited

U.S. PATENT DOCUMENTS 9,319,524 B1 * 4/2016 Webster ............... G06Q 30/016
10,825,449 B1 * 11/2020 Chinnalagu ......... G10L 15/1815
(Continued)

OTHER PUBLICATIONS

J. Devlin et al., "BERT: Pre-training of Deep Bidirectional Transformers for Language Understanding," arXiv:1810.04805v2, May 24, 2019, 16 pages.
(Continued)

*Primary Examiner* — Sherief Badawi
*Assistant Examiner* — Earl Levi Elias
(74) *Attorney, Agent, or Firm* — Ryan, Mason & Lewis, LLP

(57) ABSTRACT

Embodiments of the present disclosure provide a method, an electronic device, and a computer program product for information processing. In an information processing method, based on multiple weights corresponding to multiple words in text, a computing device determines a target object associated with the text among predetermined multiple objects, and also determines, among the multiple words, a set of key words with respect to the determination of the target object. Next, the computing device determines, among the set of key words, a set of target words related to a text topic of the text. Then, the computing device outputs the set of target words and an identifier of the target object in an associated manner. In this way, the credibility of the target object associated with the text that is determined by the information processing method is improved, thereby improving the user experience of the information processing method.

20 Claims, 14 Drawing Sheets

(51) Int. Cl.
  *G06N 5/04* (2023.01)
  *G06N 20/00* (2019.01)
(58) Field of Classification Search
  USPC .......................................................... 707/738
  See application file for complete search history.

(56) References Cited

U.S. PATENT DOCUMENTS

| | | | | |
|---|---|---|---|---|
| 11,403,715 | B2* | 8/2022 | Podgorny | G06F 16/90324 |
| 2007/0244690 | A1* | 10/2007 | Peters | G06F 40/279 |
| | | | | 707/E17.09 |
| 2007/0282772 | A1* | 12/2007 | Lee | G06N 3/02 |
| | | | | 706/25 |
| 2008/0071929 | A1* | 3/2008 | Motte | H04L 67/53 |
| | | | | 709/217 |
| 2010/0114890 | A1* | 5/2010 | Hagar | G06F 16/36 |
| | | | | 707/E17.014 |
| 2012/0041947 | A1* | 2/2012 | Maeda | G06F 16/338 |
| | | | | 707/E17.014 |
| 2013/0159236 | A1* | 6/2013 | Vladislav | G06N 5/02 |
| | | | | 706/46 |
| 2013/0198147 | A1* | 8/2013 | Jain | G06F 40/216 |
| | | | | 707/688 |
| 2014/0052712 | A1* | 2/2014 | Savage | G06F 3/0484 |
| | | | | 707/738 |
| 2019/0311301 | A1* | 10/2019 | Pyati | G06F 16/901 |

OTHER PUBLICATIONS

J. Vig, "Deconstructing BERT, Part 2: Visualizing the Inner Workings of Attention," https://towardsdatascience.com/deconstructing-bert-part-2-visualizing-the-inner-workings-of-attention-60a16d86b5c1, Jan. 7, 2019, 20 pages.

F. Pascual, "Introduction to Topic Modeling," https://monkeylearn.com/blog/introduction-to-topic-modeling/, Sep. 26, 2019, 36 pages.

S. Li, "Topic Modeling and Latent Dirichlet Allocation (LDA) in Python," https://towardsdatascience.com/topic-modeling-and-latent-dirichlet-allocation-in-python-9bf156893c24, May 31, 2018, 12 pages.

M. Kelechava, "Using LDA Topic Models as a Classification Model Input," https://towardsdatascience.com/unsupervised-nlp-topic-models-as-a-supervised-learning-input-cf8ee9e5cf28, Mar. 3, 2019, 17 pages.

* cited by examiner

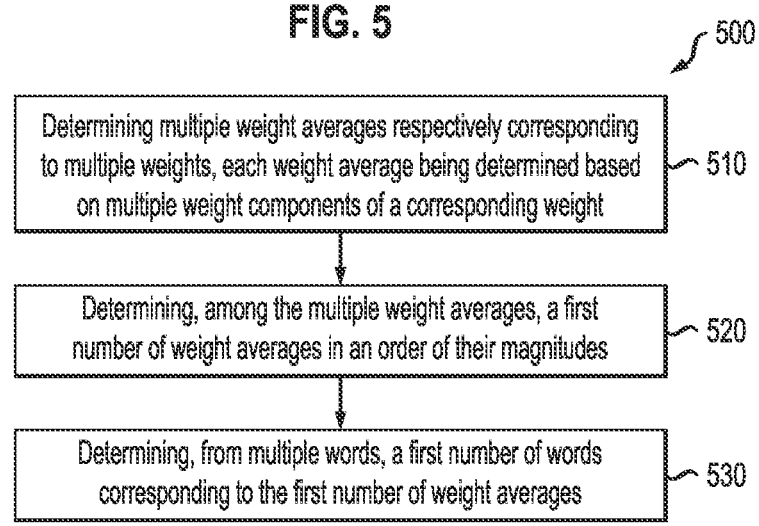
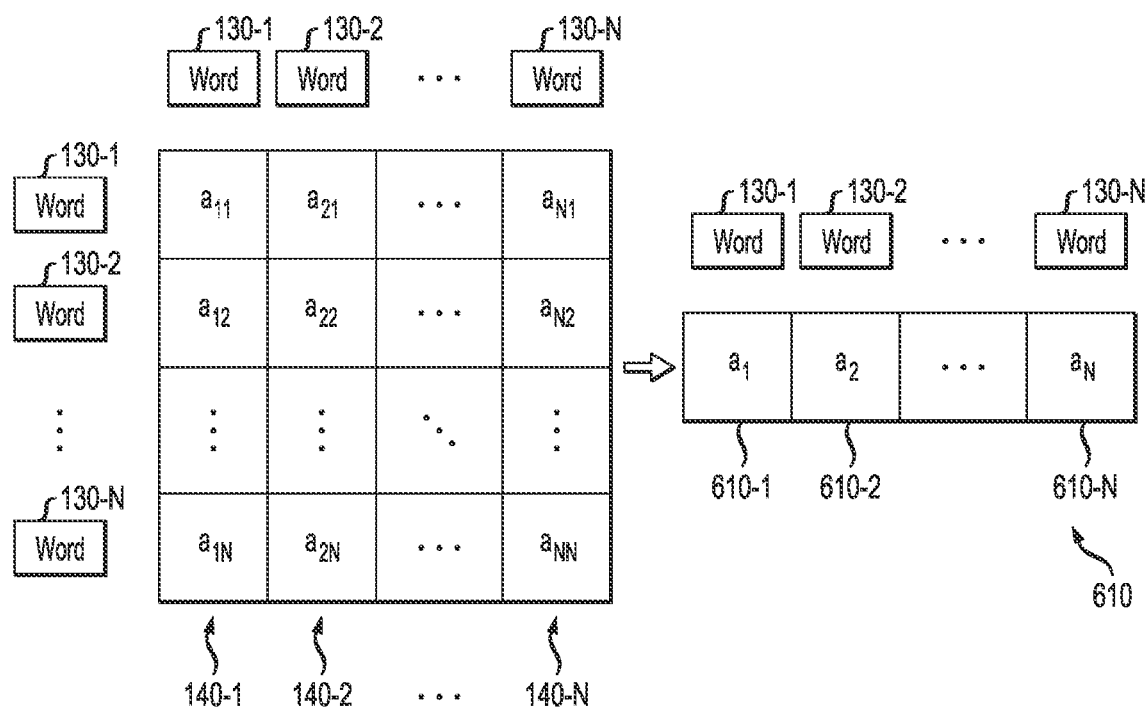

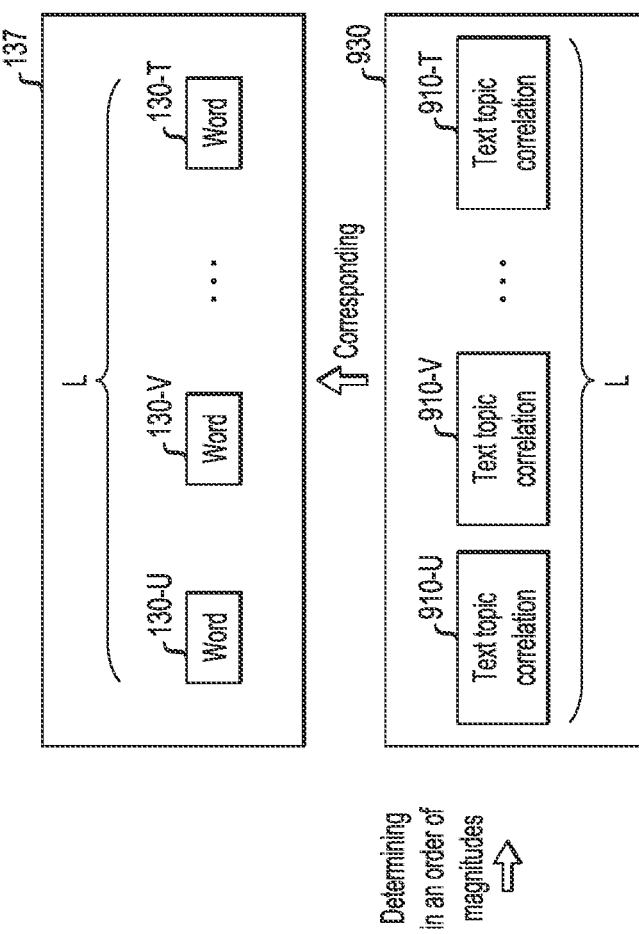
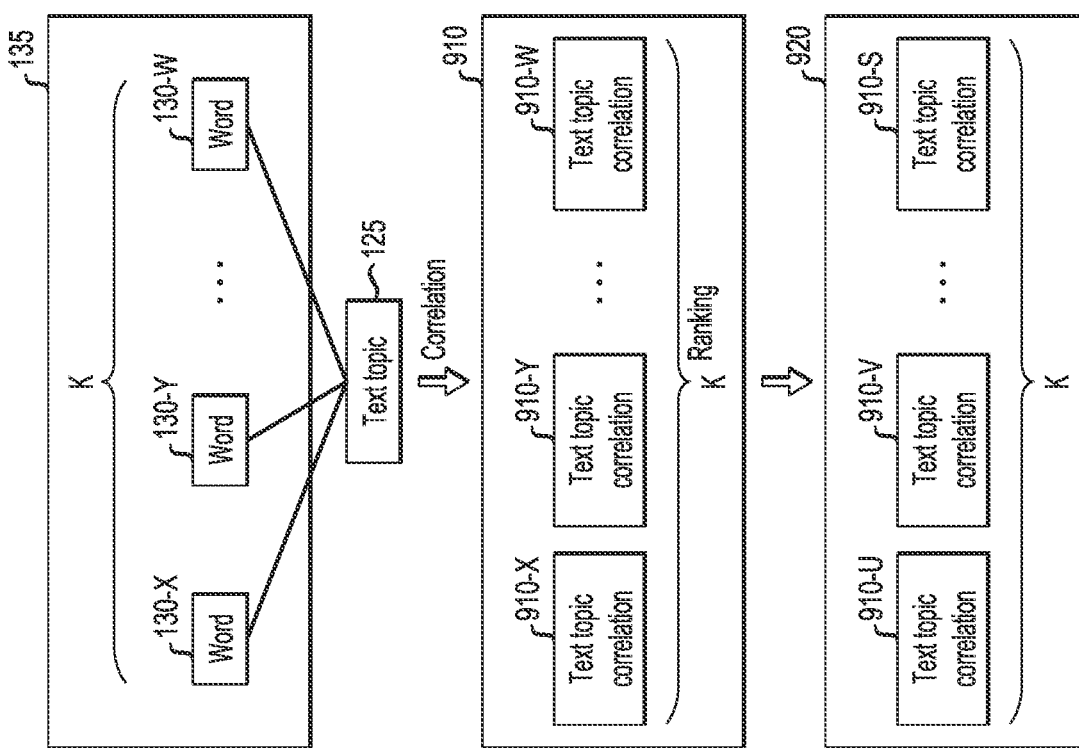
FIG. 9

METHOD, ELECTRONIC DEVICE, AND COMPUTER PROGRAM PRODUCT FOR INFORMATION PROCESSING

RELATED APPLICATION(S)

The present application claims priority to Chinese Patent Application No. 202011375820.0, filed Nov. 30, 2020, and entitled "Method, Electronic Device, and Computer Program Product for Information Processing," which is incorporated by reference herein in its entirety.

FIELD

Embodiments of the present disclosure relate generally to information technologies, computer technologies, and/or storage technologies, and more particularly to a method, an electronic device, and a computer program product for information processing.

BACKGROUND

Broadly speaking, a recommendation system is an information filtering system or an information processing system that can recommend one or more objects to a user based on information input by the user. For example, the objects recommended by the recommendation system may include multimedia content, news, books, academic papers, knowledge bases, data or information bases, searches, folksonomy, and other products or information.

The recommendation system can be used in many different scenarios. For example, in a scenario related to a storage system, the recommendation system can be used in a customer service (or technical support) system of the storage system. Specifically, a user of the storage system may encounter a problem while using the storage system, and provide the customer service system with text for describing the problem. The text can be input into the recommendation system, and the recommendation system can recommend a knowledge or information base for solving the problem to the technical support personnel of the storage system.

SUMMARY

Embodiments of the present disclosure provide a technical solution to determine a target object associated with input text and a set of target words, wherein the set of target words can improve the credibility of the target object. More specifically, embodiments of the present disclosure provide a method, an electronic device, and a computer program product for information processing.

In a first aspect of the present disclosure, an information processing method is provided. The method includes: determining, based on multiple weights corresponding to multiple words in text, a target object associated with the text among predetermined multiple objects, and a set of key words among the multiple words and with respect to the determination of the target object. The method also includes: determining, among the set of key words, a set of target words related to a text topic of the text. The method further includes: outputting the set of target words and an identifier of the target object in an associated manner.

In a second aspect of the present disclosure, an electronic device is provided. The electronic device includes at least one processor and at least one memory storing computer program instructions. The at least one memory and the computer program instructions are configured to, along with the at least one processor, cause the electronic device to: determine, based on multiple weights corresponding to multiple words in text, a target object associated with the text among predetermined multiple objects, and a set of key words among the multiple words and with respect to the determination of the target object. The at least one memory and the computer program instructions are further configured to cause, along with the at least one processor, the electronic device to: determine, among the set of key words, a set of target words related to a text topic of the text. The at least one memory and the computer program instructions are further configured to cause, along with the at least one processor, the electronic device to: output the set of target words and an identifier of the target object in an associated manner.

In a third aspect of the present disclosure, a computer program product is provided. The computer program product is tangibly stored on a non-volatile computer-readable medium and includes machine-executable instructions. The machine-executable instructions, when executed, cause a machine to execute steps of the method according to the first aspect.

It should be understood that the content described in this Summary is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become readily understandable by reading the following detailed description with reference to the accompanying drawings. In the accompanying drawings, several embodiments of the present disclosure are shown by way of example and not limitation.

FIG. 5 illustrates a flowchart of an example process for determining a set of key words according to an embodiment of the present disclosure.

FIG. 6 illustrates a schematic diagram of determining weight averages based on multiple weight components of weights according to an embodiment of the present disclosure.

FIG. 9 illustrates a schematic diagram of determining a set of target words based on multiple text topic correlations between multiple words and a text topic according to an embodiment of the present disclosure.

Throughout all the accompanying drawings, the same or similar reference numerals are used to indicate the same or similar components.

DETAILED DESCRIPTION

Figure 1:
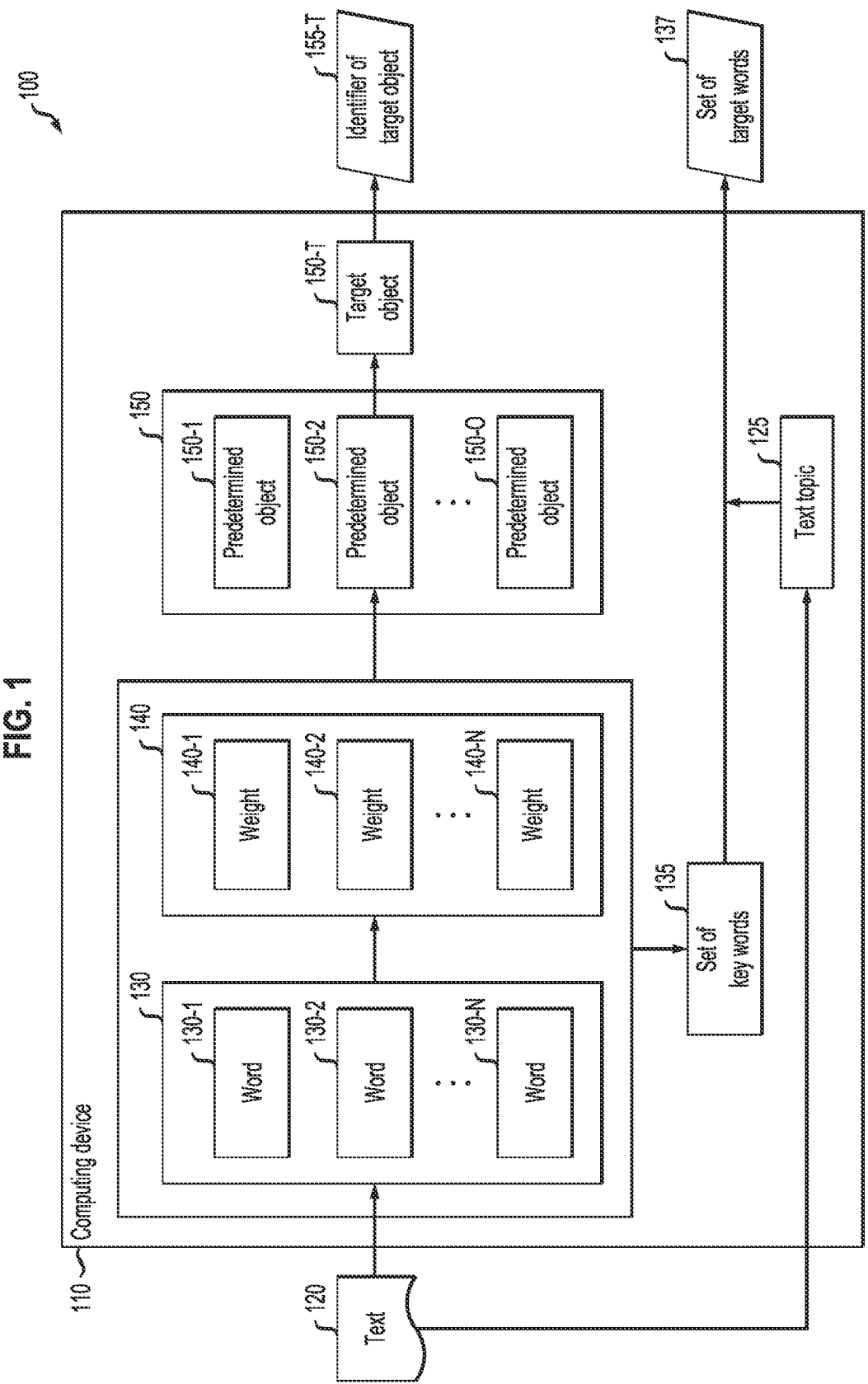
FIG. 1 illustrates a schematic diagram of an example information processing environment in which an embodiment of the present disclosure may be implemented.

The principles and spirit of the present disclosure will be described below with reference to several example embodiments shown in the accompanying drawings. It should be understood that these embodiments are described only for the purpose of enabling a person skilled in the art to better understand and then implement the present disclosure, instead of limiting the scope of the present disclosure in any way. In the description and claims herein, unless otherwise defined, all technical and scientific terms used herein have meanings that are commonly understood by those of ordinary skill in the art to which the present disclosure belongs.

As mentioned above, a recommendation system can be used in many different scenarios. For example, in a scenario related to a storage system, the recommendation system can be used in a customer service (or technical support) system of the storage system. Specifically, a user of the storage system may encounter a problem while using the storage system, and provide the customer service system with text for describing the problem. The text can be input into the recommendation system, and the recommendation system can recommend a knowledge or information base for solving the problem to the technical support personnel of the storage system.

However, conventional recommendation systems only provide users with recommended results or objects, but there is no effective solution to improve users' trust in the recommended results. As a result, users of the recommendation system may not trust the recommended results or objects. This results in poor user experience and use efficiency. More specifically, when a recommendation system recommends an object to a user, it usually does not provide the user with information to explain why the object is recommended. Such unexplained recommendation may lead to a decrease in the user's trust in the recommended object, i.e., the user may doubt the correctness or effectiveness of the recommendation result.

For example, in the above scenario where the recommendation system is used in the customer service system of the storage system, if the recommendation system only recommends the knowledge or information base for solving the problem of the storage system to the technical support personnel without explaining the reason for recommending the knowledge or information base, the technical support personnel may question whether the recommended knowledge or information base can really solve the problem of the storage system, and thus may give up further access to the knowledge or information base recommended by the recommendation system. This results in reduced user experience of the technical support personnel in using the recommendation system, which in turn makes the efficiency of solving the problem of the storage system also decreased.

In view of the above-mentioned problems and other potential problems in conventional solutions, embodiments of the present disclosure provide a technical solution to determine a target object associated with input text and a set of target words, wherein the set of target words can improve the credibility of the target object. In the embodiments of the present disclosure, based on multiple weights corresponding to multiple words in text, a computing device determines a target object associated with the text among predetermined multiple objects, and also determines a set of key words among the multiple words and with respect to the determination of the target object. Next, the computing device determines, among the set of key words, a set of target words related to a text topic of the text. Then, the computing device outputs the set of target words and an identifier of the target object in an associated manner.

In embodiments of the present disclosure, since the words in the set of target words are both key words in determining the target object and words related to the text topic of the input text, the set of target words output in an associated manner with an identifier of the target object may serve as useful auxiliary information to explain to a user why the target object is associated with the input text. In this way, the credibility of the target object provided by the information processing method or system in the embodiments of the present disclosure is increased, thereby improving the user experience of the information processing method or system. Some example embodiments of the present disclosure will be described below with reference to the accompanying drawings.

FIG. 1 illustrates a schematic diagram of example information processing environment 100 in which an embodiment of the present disclosure may be implemented. As shown in FIG. 1, information processing environment 100, which may also be referred to as information processing system 100 herein, may include computing device 110 for performing information or data processing. In other words, computing device 110 may receive input information or data, process the input information or data, and provide output information or data based on the processing on the input information or data so as to achieve some predetermined function or service.

For example, in the example depicted in FIG. 1, text 120 may be input as input information into computing device 110 for processing. Based on the processing on text 120, computing device 110 may determine target object 150-T associated with text 120 from multiple predetermined objects 150-1 to 150-0 and output identifier 155-T of target object 150-T. Hereinafter, for simplicity of description, predetermined objects 150-1 to 150-0 may also be referred to collectively as multiple predetermined objects 150 or set of predetermined objects 150, where O is a natural number. As an example, if information processing system 100 implements a recommendation system, then text 120 may be input information provided to the recommendation system, and target objects 150-T indicated by output identifier 155-T may be a recommendation result provided by the recommendation system based on text 120.

During processing on text 120, computing device 110 may determine multiple words 130-1 to 130-N included in text 120. Hereinafter, for simplicity of description, words 130-1 to 130-N may also be referred to collectively as multiple words 130 or set of words 130, where N is a natural number. In some embodiments, words 130-1 to 130-N may be all words included in text 120, that is, a complete set of words of text 120. In this way, the accuracy of the related information or processing result determined by computing device 110 based on text 120 can be improved. Alternatively, in other embodiments, words 130-1 to 130-N may also be a subset of the complete set of words in text 120, that is, a part of the words in text 120. In this way, the computational overhead of computing device 110 for processing text 120 can be reduced.

It should be pointed out that "words" used herein should be understood broadly as any characters or symbols used to express information, including not only words in the ordinary sense, but also any other symbols used to express information or to assist in expressing information. In addition, the text, words, or other elements in the embodiments of the present disclosure are not limited to a particular language (such as Chinese or English), but are equivalently applicable to any language known or appearing in the future. Further, the embodiments of the present disclosure may also be applicable to non-human languages, such as machine programming languages, and so on. Therefore, in a general sense, "text" in the embodiments of the present disclosure may refer to any set of characters or symbols that express information, and "words" in the embodiments of the present disclosure may refer to individuals or combinations of such characters or symbols.

Still referring to FIG. 1, after determining set of words 130 in text 120, computing device 110 may set a corresponding weight for each of words 130-1 to 130-N in set of words 130. In some embodiments, the weight of a certain word may indicate the importance of the word in the process of determining target object 150-T. For example, relative to low-weight words with low weights, high-weight words with higher weights are more important in determining target object 150-T. That is, computing device 110 relies or focuses more on high-weight words to determine target object 150-T. Therefore, in the text, the weight of a word can also be referred to as an "attention" or "attention weight" of the word. Specifically, in the example of FIG. 1, word 130-1 is configured with weight 140-1, word 130-2 is configured with weight 140-2, . . . , word 130-N is configured with weight 140-N, and so on. Hereinafter, for simplicity of description, weights 140-1 to 140-N may also be referred to collectively as multiple weights 140 or set of weights 140.

In some embodiments, computing device 110 may determine weights 140-1 to 140-N based on a trained text classification model for natural language processing (NLP). Since text classification models for NLP are usually trained using large amounts of text, they are able to understand the semantics contained in text 120 well enough to reasonably assign corresponding weights 140-1 to 140-N to words 130-1 to 130-N in text 120, thereby improving the reasonableness and effectiveness of weights 140-1 to 140-N. As an example, such a text classification model for NLP may include a text classification model based on bidirectional encoder representations from transformers (BERT). The BERT model is a machine learning model that can be applied to various NLP tasks and has shown excellent results in various NLP tasks including text classification. The key technical feature of the BERT model is applying bidirectional training of the attention model "transformer" to language modeling and fine-tuning the language model with respect to specific tasks. Hereinafter, the concept of attention weight in the embodiments of the present disclosure will be further illustrated with reference to FIGS. 2 and 3.

Figure 2:
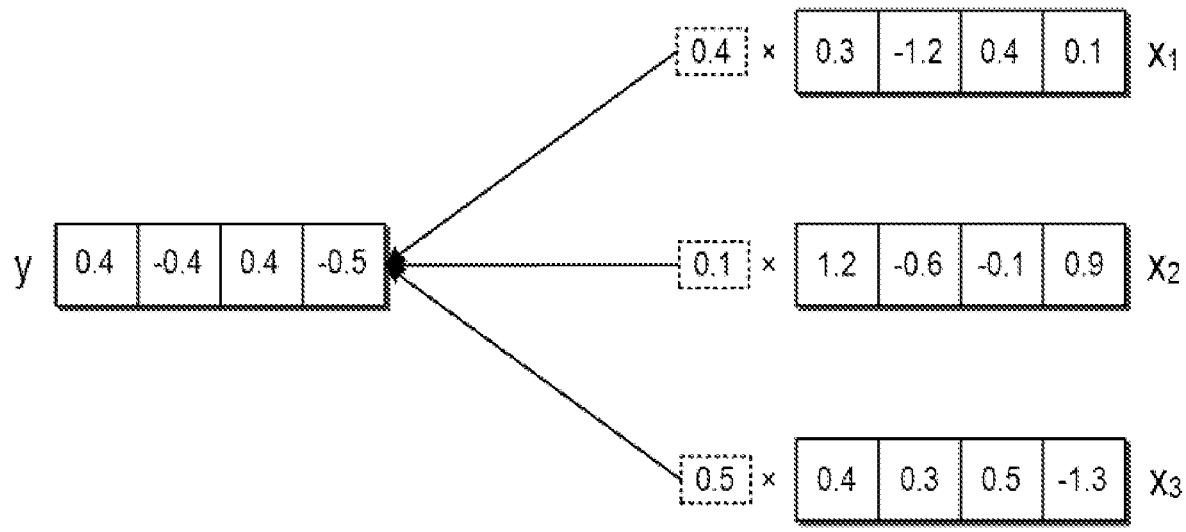
FIG. 2 illustrates a schematic diagram of setting respective weights for multiple vectors so as to calculate a result vector in an embodiment of the present disclosure.

FIG. 2 illustrates a schematic diagram of setting respective weights for multiple vectors so as to calculate a result vector in an embodiment of the present disclosure. In the example in FIG. 2, suppose that the input data includes three vectors, i.e., $x_1=\{0.3, -1.2, 0.4, 0.1\}$, $x_2=\{1.2, -0.6, -0.1, 0.9\}$, and $x_3=\{0.4, 0.3, 0.5, -1.3\}$, respectively. In addition, suppose that these three vectors are assigned "attention" with magnitudes of 0.4, 0.1, and 0.5, respectively. In this case, weighted summation of $x_1$, $x_2$ and $x_3$ is performed based on the respective attention magnitudes of the input vectors to obtain a result vector $y=\{0.4, -0.4, 0.4, -0.5\}=0.4\times\{0.3, -1.2, 0.4, 0.1\}+0.1\times\{0.3, -1.2, 0.4, 0.1\}+0.5\times\{0.3, -1.2, 0.4, 0.1\}$. As can be seen, in the example depicted in FIG. 2, the attention magnitudes of the input vectors are just another way of stating the weights in the weighted averaging operation. That is, the attention or weight of each vector indicates the degree of focus on each input in the weighted averaging calculation.

It should be noted that the use of attention weights in a weighted summation operation illustrated in FIG. 2 is only an example and is not intended to limit the scope of the present disclosure in any way. In other embodiments, the terms "weight" or "attention weight" herein are equivalently applicable to any other operations in which weights may be assigned. Further, it will be understood that the specific values of vectors, the specific number of dimensions of vectors, the specific number of vectors, etc. depicted in FIG. 2 are merely schematic and are not intended to limit the scope of the present disclosure in any way. In some embodiments, all the various words, text topics, predetermined topics, or other elements involved herein can be vectorized (also referred to as being embedded) in an appropriate manner, so that they can be represented using vectors similar to those in FIG. 2, and thus weighted summation operations or other operations that use weights can be performed.

Figure 3:
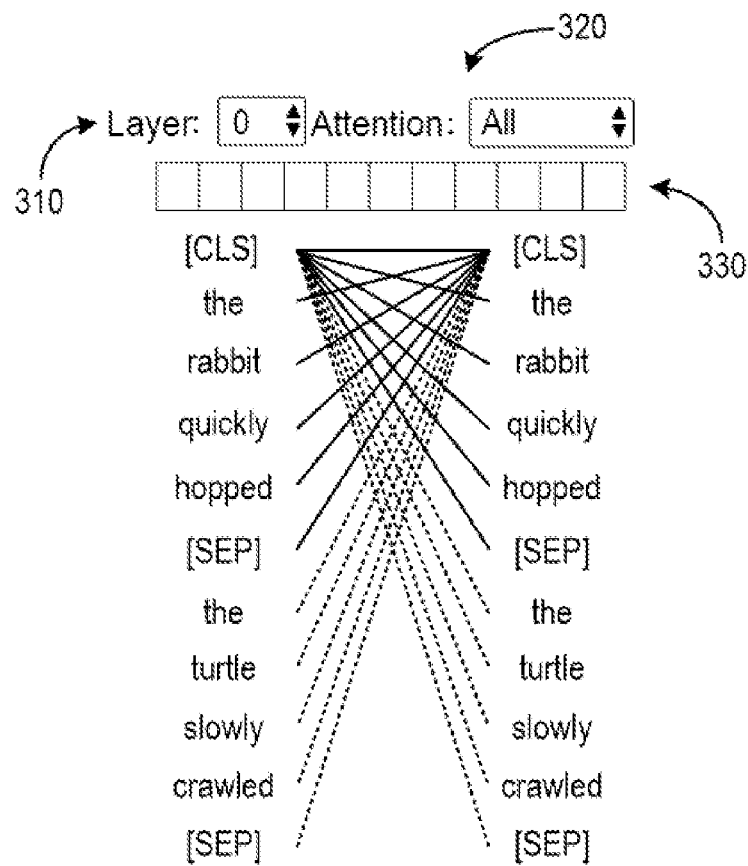
FIG. 3 illustrates a schematic diagram of attention weight visualization according to an embodiment of the present disclosure.

FIG. 3 illustrates a schematic diagram of attention weight visualization according to an embodiment of the present disclosure. In the example depicted in FIG. 3, suppose that the input content (e.g., input text 120 in FIG. 1) contains two English sentences: "the rabbit quickly hopped" and "the turtle slowly crawled." As shown in FIG. 3, computing device 110 (or an NLP model running on it) can visualize the attention weight associated with each word. For example, the attention weight of a certain word is given by considering the correlations between that word and all the input words (including that word itself), so these attention weights can be represented by lines between words. In some embodiments, in order to better process text 120, computing device 110 (or the NLP model running on it) may add auxiliary symbols to the input words, and these auxiliary symbols will also be considered as "words" for subsequent analysis and processing. For example, the symbol "[SEP]" in FIG. 3 is a special separator indicating a sentence boundary, while the symbol "[CLS]" is a symbol attached to the front of the input for classification tasks.

In the example in FIG. 3, the lines resulting from the attention weights being visualized follow the layout design of FIG. 3 to connect the words that are being updated (left column) with the words that are being focused on (right column). For example, a solid line is used to indicate a large attention weight, and a dashed line is used to indicate a small attention weight. In other embodiments, computing device 110 (or the NLP model running on it) may also use different color intensities to reflect the magnitudes of the attention weights. For example, weights close to 1 can be displayed as very dark lines, while weights close to 0 can be displayed as faint lines or not visible at all. In addition, users can highlight a specific word to see the attention from that word only. It should be noted that in FIG. 3, for clarity, only the lines of attention weights related to "[CLS]" are shown as an example, while lines of attention weights related to other words are omitted. However, in an actual visualization view, there can be a line of attention weight between any two words or symbols.

As shown in FIG. 3, the attention weight between two words that do not cross the sentence boundary is relatively high. This is because the trained NLP model can understand that words should be associated with the other words in the same sentence so as to best understand their context. In addition, certain specific word pairs (for example, words "rabbit" and "hopped") may have a higher attention weight than other word pairs. In the example of FIG. 3, an understanding of the relationship between these words can help computing device 110 (or the NLP model running on it) determine that these two sentences are descriptions of natural scenarios rather than comments by a meat gourmet on a busy restaurant providing rabbit services.

In addition, in the example of FIG. 3, relevant setting bars for attention weight visualization are also provided so that the user can set the attention weight visualization accordingly. For example, setting bar 310 can be used to select a layer number for which attention weights are to be displayed, setting bar 320 can be used to select which words associated with the attention weights are to be displayed specifically, and setting bar 330 can be used to set the colors of lines indicating the attention weights. As shown in FIG. 3, each cell in setting bar 330 can be marked with a different color, and the user can click a corresponding color cell to select the color of the line.

Referring back to FIG. 1, in addition to outputting identifier 155-T of target object 150-T, computing device 110 may also output set of target words 137 and identifier 155-T in an associated manner. In some embodiments, the words in the output set of target words 137 are both key words with high importance in the process of determining target object 150-T and words related to the topic of text 120. In other words, set of target words 137 can in one aspect indicate why computing device 110 determines that target object 150-T is associated with text 120, and can in another aspect reflect the topic of text 120. Therefore, after learning set of target words 137, a user of information processing system 100 can sufficiently understand and believe that target object 150-T is associated with text 120, and thus the user's trust in target objects 150-T is increased. Hereinafter, a detailed description of how computing device 110 processes text 120 to obtain target object 150-T and set of target words 137 will be provided with reference to FIG. 4.

It should be noted that information processing system 100 depicted in FIG. 1 may be applicable to a wide variety of scenarios in which an associated object is determined based on input text. In different scenarios, text 120 may have different contents, and multiple predetermined objects 150 may be different objects. As an example, information processing system 100 may be used as a recommendation system in a customer service system of a storage system. In such an example, text 120 may be a description text about a failure of the storage system, and multiple predetermined objects 150 may be predetermined multiple knowledge bases (KBs). In some embodiments, the multiple knowledge bases may include different sets of text associated with solving different types of failures of the storage system. For example, a certain specific knowledge base may contain reference materials, useful notes, or previous solutions, and so on, for solving a certain type of problems of the storage system.

Therefore, in the above scenario in which the information processing system is as a recommendation system in a customer service system, based on description text 120 of the failure of the storage system that is provided by the user of the storage system, information processing system 100 may indicate, among multiple predetermined knowledge bases, to the technical support personnel a target knowledge base associated with the content of failure description text 120 so as to direct the technical support personnel to access the target knowledge base, thereby assisting the technical support personnel in solving the failure of the storage system. In addition, information processing system 100 may also provide the technical support personnel with set of target words 137 to illustrate or explain to the technical support personnel why the target knowledge base is associated with failure description text 120, thereby enhancing the technical support personnel's trust in the target knowledge base, and thus improving the efficiency in solving the failure of the storage system by the technical support personnel.

In some embodiments, computing device 110 may include any device capable of performing computing functions and/or control functions, including, but not limited to, a dedicated computer, a general-purpose computer, a general-purpose processor, a micro-processor, a micro-controller, or a state machine. Computing device 110 may be implemented as an individual computing device or a combination of computing devices, for example, a combination of a digital signal processor (DSP) and a microprocessor, multiple microprocessors, one or more microprocessors combined with a DSP core, or any other such configuration. It should also be noted that in the context of the present disclosure, computing device 110 may also be referred to as electronic device 110, and the two terms are used interchangeably herein.

In some embodiments, the storage devices in the storage system involved in the present disclosure may be any device or system with storage capabilities that is capable of providing storage services or functions, including, but not limited to, backup storage stations, cloud storage systems, hard disk drives (HDDs), solid state disks (SSDs), removable disks, compact disks (CDs), laser disks, optical disks, digital versatile disks (DVDs), floppy disks, Blu-ray disks, Serial Attached Small Computer System Interface (SCSI)

storage disks (SAS), Serial Advanced Technology Attached (SATA) storage disks, any other magnetic storage devices, and any other optical storage devices, or any combination thereof.

In some embodiments, a data source or client terminal in the storage system involved in the present disclosure may refer to any device that is capable of generating data and accepting data storage services. In some embodiments, such devices include, but are not limited to, personal computers, tablet computers, laptop computers, notebook computers, netbook computers, any other type of computers, cellular or smart phones, media player devices, e-book devices, mobile WiFi devices, wearable computing devices, wireless devices, mobile devices, user devices, and any other type of electronic devices.

In some embodiments, communication links between various components of the storage system involved in the present disclosure may be any form of connection or coupling that can achieve data communication or control signal communication between these components, including but not limited to, coaxial cables, fiber-optic cables, twisted pairs, or wireless technology (such as infrared, radio, and microwave). In some embodiments, the communication links may also include, but are not limited to, network cards, hubs, modems, repeaters, bridges, switches, routers, and other devices for network connection, as well as various network connection lines, wireless links, and the like. In some embodiments, the communication links may include various types of buses. In other embodiments, the communication links may include computer networks, communication networks, or other wired or wireless networks.

It should be understood that FIG. 1 only schematically shows units, elements, modules, or components in information processing environment 100 that are related to the embodiments of the present disclosure. In practice, information processing environment 100 may also include other units, elements, modules, or components for other functions. In addition, the particular numbers of units, elements, modules, or components shown in FIG. 1 are only illustrative, and are not intended to limit the scope of the present disclosure in any way. In other embodiments, information processing environment 100 may include any appropriate numbers of computing devices and related elements. Therefore, the embodiments of the present disclosure are not limited to the specific scenario depicted in FIG. 1, but are generally applicable to any technical environment for information processing.

Figure 4:
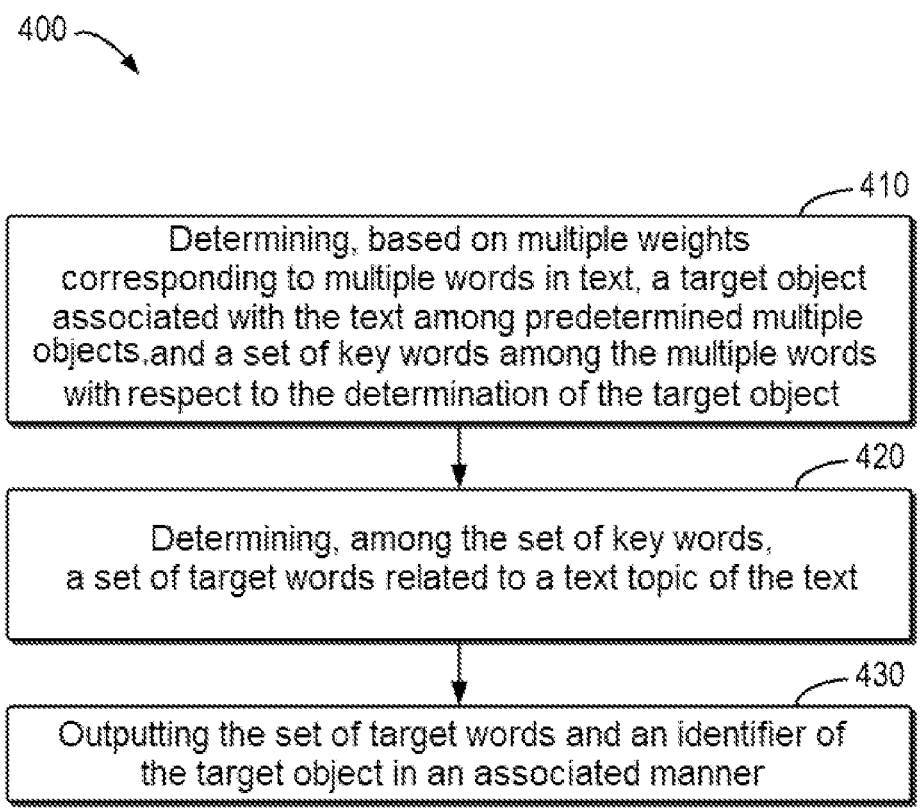
FIG. 4 illustrates a flowchart of an example information processing method according to an embodiment of the present disclosure.

FIG. 4 illustrates a flowchart of example information processing method 400 according to an embodiment of the present disclosure. In some embodiments, method 400 can be implemented by computing device 110 in environment 100, for example, it may be implemented by a processor or processing unit of computing device 110, or by various functional modules of computing device 110. In other embodiments, method 400 can also be implemented by a computing device independent of environment 100, or may be implemented by other units or modules in environment 100. For ease of discussion, method 400 will be described in conjunction with FIG. 1.

At block 410, computing device 110 determines target object 150-T associated with text 120 among predetermined objects 150-1 to 150-0 based on weights 140-1 to 140-N corresponding to words 130-1 to 130-N in text 120. It should be noted that on the basis of set of words 130 and set of weights 140, computing device 110 may determine target object 150-T in any appropriate manner.

For example, taking object 150-1 in set of objects 150 as an example, computing device 110 may use related information about object 150-1 to vectorize object 150-1. On the other hand, computing device 110 may vectorize words 130-1 to 130-N. Then, computing device 110 may calculate N correlations between words 130-1 to 130-N and object 150-1, respectively. Next, computing device 110 may perform weighted averaging of the N correlations according to corresponding weights 140-1 to 140-N of words 130-1 to 130-N, so as to obtain the correlation between text 120 and object 150-1. In a similar manner, computing device 110 may also calculate the correlations between text 120 and objects 150-2, . . . , and 150-0 in the set of objects 150, respectively, thereby obtaining O correlations between text 120 and objects 150-1 to 150-0. Thereafter, computing device 110 may determine the object corresponding to the largest correlation among the O correlations as target object 150-T.

In other embodiments, computing device 110 may determine target object 150-T based on a trained text classification model (for example, a BERT model) for NLP. In these embodiments, the manner in which computing device 110 determines target object 150-T from set of predetermined objects 150 based on words 130 and weights 140 will depend on the specific algorithm of the text classification model. For example, the trained BERT model can vectorize words 130-1 to 130-N in input text 120, and determine respective weights 140-1 to 140-N for words 130-1 to 130-N. Then, based on set of words 130 and set of weights 140, the BERT model can determine, according to its specific classification algorithm, target object 150-T from set of predetermined objects 150.

At block 410, in addition to determining target object 150-T, computing device 110 also determines, based on set of words 130 and set of weights 140, set of key words 135 in set of words 130 and with respect to the determination of target object 150-T. In other words, the words in set of key words 135 are "more critical" or "more important" than other words in set of words 130 for finding target object 150-T from set of objects 150. That is, set of key words 135 is a set of words that are more important in the process of determining target object 150-T, or a set of words that receive more focus or attention in the process of determining target object 150-T.

As mentioned above, weights 140-1 to 140-N may be understood as the importance of words 130-1 to 130-N in determining target object 150-T, or may be understood as the focus or attention of computing device 110 on words 130-1 to 130-N, respectively, in determining target object 150-T. Therefore, set of key words 135 in set of words 130 can be determined based on set of weights 140 corresponding to set of words 130. In some embodiments, computing device 110 may determine words with weights above a weight threshold as belonging to set of key words 135 and words with weights below the weight threshold as not belonging to set of key words 135. For example, the weight threshold can be determined according to the specific technical environment and application scenario.

In further embodiments, without using a weight threshold, computing device 110 may determine a set of words with relatively large weights among words 130-1 to 130-N as set of key words 135. For example, computing device 110 may rank weights 140-1 to 140-N according to an order of their magnitudes. Computing device 110 may then determine a set of words corresponding to a predetermined number of weights with the highest magnitude rankings as set of key words 135. Of course, in some examples, set of key words 135 is not necessarily the set of words with the highest weight magnitude rankings in set of words 130, but may be a set of words with relatively high weight magnitude rankings. In these examples, the weight magnitude rankings of the words of set of key words 135 in set of words 130 may be continuous or discontinuous.

In the previous embodiments, weights 140-1 to 140-N of words 130-1 to 130-N in text 120 are described as being weight values. Multiple weight values can be compared directly in terms of weight magnitude. However, in other embodiments, one or more of the weights in set of weights 140 may not be weight values, but rather weight vectors with multiple weight components. The weight vectors cannot be compared directly with weight values or other weight vectors in terms of weight magnitude. For example, suppose that weight 140-1 of word 130-1 is not a weight value, but a weight vector consisting of multiple weight components. In this case, the magnitude of weight 140-1 may need to be determined based on the weight components of weight 140-1, and in turn set of key words 135 in set of words 130 also needs to be determined considering various weight components of the weights. Such embodiments will be described below with reference to FIGS. 5 to 7.

At block 420, after determining set of key words 135 in set of words 130, computing device 110 further determines, among set of key words 135, set of target words 137 related to text topic 125 of text 120. That is to say, in set of key words 135, some words can be considered to be related to text topic 125 and they belong to set of target words 137, while the other words can be considered to be unrelated to text topic 125 and they do not belong to set of target words 137. It should be noted that in the embodiments of the present disclosure, words that are not included in set of target words 137 may not be completely unrelated to text topic 125, but have a low correlation to text topic 125, for example, below a predetermined correlation threshold.

In some embodiments, in order to determine set of target words 137 in set of key words 135, computing device 110 may first determine text topic 125 of text 120. For example, computing device 110 may analyze the content recorded in text 120 to generalize or summarize text topic 125. After determining text topic 125, computing device 110 may obtain set of target words 137 based on the correlation between each word in set of key words 135 and text topic 125.

In some cases, text topic 125 of text 120 may be represented using one or more topic words. The topic words may be words in text 120 or other words that are not included in text 120. In the case of representing text topic 125 using topic words, the correlation between a certain word in set of key words 135 and text topic 125 can be represented as the correlation between the word and these topic words. As a simple example, suppose that text topic 125 can be represented by the topic words "read," "data," and "timeout." In this case, computing device 110 may determine a set of words in set of key words 135 that are semantically close to these topic words as set of target words 137.

In other embodiments, as a quantitative calculation method for correlations, computing device 110 may vectorize each word in set of words 130 and vectorize one or more topic words of text topic 125. Then, computing device 110 may calculate the sum of correlations between the vector of each word in set of words 130 and the topic word vectors of text topic 125. Next, computing device 110 may determine a word of which the sum of correlations is higher than a correlation threshold as being related to text topic 125, and determine a word of which the sum of correlations to text topic 125 is lower than the correlation threshold as being unrelated to text topic 125.

In other embodiments, without using a correlation threshold, computing device 110 may determine a set of words in set of key words 135 that have relatively large correlations to text topic 125 as set of target words 137. For example, computing device 110 may rank the correlations between the words in set of key words 135 and text topic 125 according to an order of their magnitudes. Then, computing device 110 may determine a set of words corresponding to a predetermined number of correlations with the highest or higher magnitude rankings as set of target words 137. Such embodiments will be described below with reference to FIGS. 8 and 9.

At block 430, after determining target object 150-T and set of target words 137, computing device 110 outputs set of target words 137 and identifier 155-T of target object 150-T in an associated manner. That is, computing device 110 can output both identifier 155-T and set of target words 137 in an associated manner, so that the user of information processing system 100 can understand that set of target words 137 is auxiliary information associated with target object 150-T indicated by identifier 155-T.

In some embodiments, the association between output identifier 155-T and set of target words 137 can be expressed in an explicit manner. For example, computing device 110 may indicate the association between identifier 155-T and set of target words 137 through explicit characters or symbols. As an illustrative example, computing device 110 may output: "target object 150-T with identifier 155-T is associated with text 120, and set of target words 137 is auxiliary information about this," or similar explicitly stated content, and so on. In other embodiments, computing device 110 may also implicitly indicate the association between output identifier 155-T and set of target words 137. For example, computing device 110 may respectively output identifier 155-T and set of target words 137 at two positions close to each other on a display device, thereby implicitly reflecting the association between the two.

In some embodiments, computing device 110 may output set of target words 137 as explanation information about the association between text 120 and target object 155-T. In other words, computing device 110 may output set of target words 137 for explaining the reason for determining, among multiple predetermined objects 150, target object 150-T that is associated with input text 120. In this way, the user of information processing system 100 not only can learn target object 150-T associated with text 120, but also can understand why target object 150-T is associated with text 120, so that the user's trust in target object 150-T is improved, thereby enhancing the user's use experience and use efficiency in using information processing system 100. In some embodiments, information processing system 100 may implement a recommendation system, then target object 150-T may be a recommendation result of the recommendation system, and set of target words 137 may be the reason why target object 150-T is recommended.

Through information processing method 400, information processing system 100 (for example, a recommendation system) implemented by computing device 110 not only can indicate target object 150-T as an information processing result (for example, a recommendation result) to the user, but also can provide the user with set of target words 137 as auxiliary information to explain to the user why target object 150-T is associated with input text 120. Therefore, the user's trust in the information processing result (for example, the recommendation result) of information processing system 100 is improved, thereby improving the user's use experience and use efficiency in using the information processing system.

As mentioned above when describing example method 400, in some embodiments, one or more of the weights in set of weights 140 corresponding to set of words 130 may be weight vectors including multiple weight components. In these embodiments, the magnitude measurement of a weight may need to take into account each weight component of the weight. Therefore, the determination of set of key words 135 in set of words 130 also needs to be based on the weight components of the weight vectors in set of weights 140. Such embodiments will be described below with reference to FIGS. 5 to 7.

FIG. 5 illustrates a flowchart of example process 500 for determining set of key words 135 according to an embodiment of the present disclosure. In some embodiments, process 500 can be implemented by computing device 110 in environment 100, for example, implemented by a processor or a processing unit of computing device 110, or by various functional modules of computing device 110. In other embodiments, process 500 may also be implemented by a computing device independent of environment 100, or may be implemented by other units or modules in environment 100.

Figure 7:
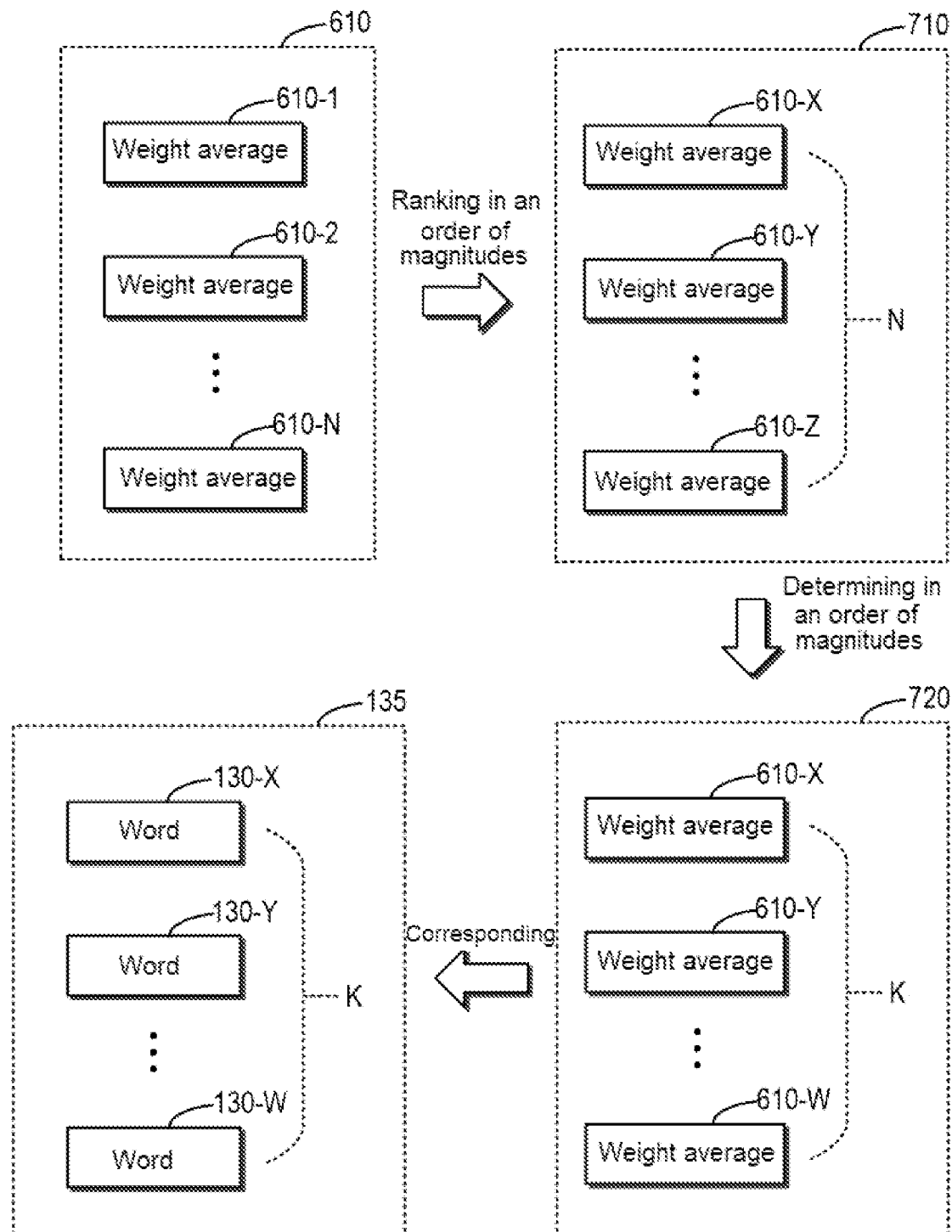
FIG. 7 illustrates a schematic diagram of determining a set of key words based on weight averages of words according to an embodiment of the present disclosure.

FIG. 6 illustrates a schematic diagram of determining weight averages 610-1, 610-2, . . . , and 610-N based on multiple components of weights 140-1, 140-2, . . . , and 140-N according to an embodiment of the present disclosure. It should be noted that although in the example of FIG. 6, each weight in set of weights 140 is a weight vector including multiple weight components, this is only illustrative and is not intended to limit the scope of the present disclosure in any way. In other embodiments, a part of the weights in set of weights 140 may be weight vectors including multiple weight components, and the other part of the weights may be weight values. FIG. 7 illustrates a schematic diagram of determining set of key words 135 based on weight averages 610-1 to 610-N of words 130-1 to 130-N according to an embodiment of the present disclosure. Hereinafter, for simplicity of description, weight averages 610-1 to 610-N may also be referred to as multiple weight averages 610 or set of weight averages 610.

Referring first to the example depicted in FIG. 6, each weight in set of weights 140 corresponding to set of words 130 may be a weight vector including multiple weight components. Taking word 130-1 as an example, its corresponding weight 140-1 is a weight vector $\{a_{11}, a_{12}, \ldots, a_{1N}\}$, where the weight component au represents a weight determined based on the correlation between word 130-1 and itself, the weight component $a_{12}$ represents a weight determined based on the correlation between word 130-1 and word 130-2, . . . , and $a_{1N}$ represents a weight determined based on the correlation between word 130-1 and word 130-N. That is, weight components $a_{11}, a_{12}, \ldots,$ and $a_{1N}$ of weight 140-1 are determined based on multiple word correlations between words 130-1 to 130-N and word 130-1, respectively. Such attention weight determination approach can also be referred to as a "self-attention" mechanism. That is, in the example of FIG. 6, computing device 110 uses a self-attention mechanism to assign attention weights 140-1 to 140-N to words 130-1 to 130-N in text 120, thereby increasing the reasonableness of set of weights 140.

Similarly, weight 140-2 corresponding to word 130-2 can be represented as a vector $\{a_{21}, a_{22}, \ldots, a_{2N}\}$, where weight component $a_{21}$ represents a weight determined based on the correlation between word 130-2 and word 130-1, weight component $a_{22}$ represents a weight determined based on the correlation between word 130-2 and itself, . . . , and $a_{2N}$ represents a weight determined based on the correlation between word 130-2 and word 130-N. Similarly, weight 140-N corresponding to word 130-N can be represented as a vector $\{a_{N1}, a_{N2}, \ldots, a_{NN}\}$, where the weight component am represents a weight determined based on the correlation between word 130-N and word 130-1, the weight component $a_{N2}$ represents a weight determined based on the correlation between word 130-N and word 130-2, . . . , and $a_{NN}$ represents a weight determined based on the correlation between word 130-N and itself. In some embodiments, a matrix consisting of the weight vectors $\{a_{11}, a_{12}, \ldots, a_{1N}\}$, $\{a_{21}, a_{22}, \ldots, a_{2N}\}, \ldots,$ and $\{a_{N1}, a_{N2}, \ldots, a_{NN}\}$ can be referred to as a weight matrix or an attention matrix, and based on this weight matrix, a visualization graph similar to that depicted in FIG. 3 can be generated.

Referring to FIGS. 5 and 6 at the same time, at block 510 in FIG. 5, computing device 110 determines weight averages 610-1 to 610-N respectively corresponding to weights 140-1 to 140-N, that is, set of weight averages 610. As shown in FIG. 6, each weight average in set of weight averages 610 is determined based on multiple weight components of the corresponding weight. For example, weight average 610-1 corresponding to word 130-1 is an average of weight components $a_{11}, a_{12}, \ldots,$ and $a_{1N}$ of weight 140-1. Similarly, weight average 610-2 corresponding to word 130-2 is an average of weight components $a_{11}, a_{22}, \ldots,$ and $a_{2N}$ of weight 140-2, and weight average 610-N corresponding to word 130-N is an average of weight components $a_{N1}, a_{N2}, \ldots,$ and $a_{NN}$ of weight 140-N. In other words, each weight average in set of weight averages 610 is an average calculated by columns in the weight matrix of set of weights 140.

It should be noted that although in the example of FIG. 6, an average of weight components of a weight vector is used as a measurement to measure the weight magnitude of the weight vector, this is only illustrative and is not intended to limit the scope of the present disclosure in any way. In other embodiments, computing device 110 may also use other calculation methods to measure the weight magnitude of a weight vector based on weight components of the weight vector. For example, computing device 110 may calculate the sum or the normalized sum of weight components of a weight vector to measure the weight magnitude of the weight vector.

Referring to FIGS. 5 and 7, at block 520 of FIG. 5, after determining set of weight averages 610 corresponding to set of weights 140, computing device 110 determines, among weight averages 610-1 to 610-N, a predetermined number (K, K≤N, K being a natural number) of weight averages 610-X, 610-Y, . . . , and 610-W according to an order of their magnitudes. Hereinafter, for simplicity of description, the predetermined number K here may also be referred to as the first number K. As depicted in FIG. 7, in some embodiments, computing device 110 may first rank weight averages 610-1 to 610-N in terms of magnitude to obtain ordered set of weight averages 710. That is, ordered set of weight averages 710 still includes a number N of weight averages, but the N weight averages are ranked according to an order of their magnitudes. For example, weight average 610-X is the largest weight average in set of weight averages 610, followed by weight average 610-Y, . . . , and weight average 610-Z is the smallest weight average in set of weight averages 610.

Then, computing device 110 may determine ordered subset of weight averages 720 in ordered set of weight averages 710 based on the magnitude rankings of the weight averages. In the example depicted in FIG. 7, ordered subset of weight averages 720 includes the first number K of weight averages, in ordered set of weight averages 710, that have the highest magnitude rankings, i.e., weight average 610-X, weight average 610-Y, . . . , and weight average 610-W. In other embodiments, ordered subset of weight averages 720 may also be the first number K of weight averages, in ordered set of weight averages 710, that have relatively high magnitude rankings, i.e., K relatively large weight averages. In addition, in such embodiment, the magnitude rankings of the first number K of weight averages of ordered subset of weight averages 720 in ordered set of weight averages 710 are not necessarily continuous.

Still referring to FIGS. 5 and 7, at block 530 of FIG. 5, after determining ordered subset of weight averages 720, computing device 110 determines, from words 130-1 to 130-N, the first number K of words 130-X, 130-Y, . . . , and 130-W corresponding to the first number K of weight averages 610-X, 610-Y, . . . , and 610-W to serve as set of key words 135 depicted in FIG. 1. This is because, in the example depicted in FIGS. 5 to 7, since words 130-X, 130-Y, . . . , and 130-W respectively correspond to large weight averages 610-X, 610-Y, . . . , and 610-W, i.e., these words are more important or receive more attention from computing device 110 in the process of determining target object 150-T, computing device 110 may determine the first number K of words 130-X, 130-Y, . . . , and 130-W as set of key words 135.

Through example process 500, even if one or more weights in set of weights 140 corresponding to set of words 130 are weight vectors and thus cannot be directly compared with weight values or other weight vectors in terms of weight magnitude, computing device 110 can reasonably measure the weight magnitudes of these weight vectors and achieve a reasonable comparison between them and weight values or other weight vectors in terms of weight magnitude, thereby improving the reasonableness of target object 150-T and set of target words 137, thus enhancing the performance of information processing system 100.

As mentioned above when describing example method 400, in some embodiments, computing device 110 may rank the correlations between the words in set of key words 135 and text topic 125 according to an order of their magnitudes. Then, computing device 110 may determine a set of words corresponding to a predetermined number of correlations with the highest or higher magnitude rankings as set of target words 137. Such embodiments will be described below with reference to FIGS. 8 and 9.

Figure 8:
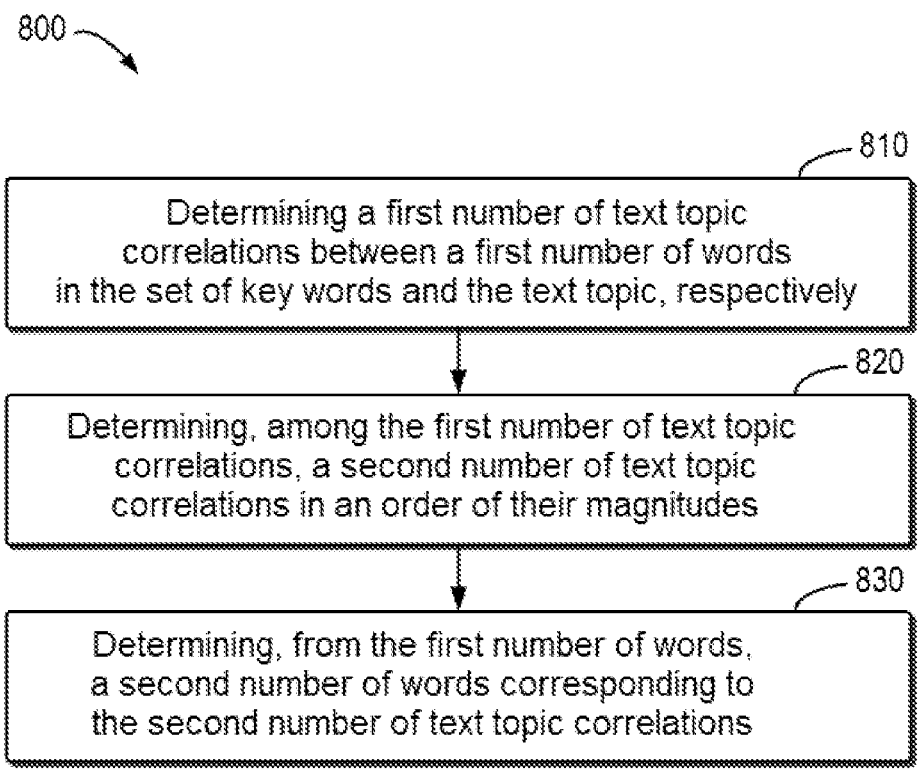
FIG. 8 illustrates a flowchart of an example process for determining a set of target words according to an embodiment of the present disclosure.

FIG. 8 illustrates a flowchart of example process 800 for determining set of target words 137 according to an embodiment of the present disclosure. In some embodiments, process 800 can be implemented by computing device 110 in environment 100, for example, implemented by a processor or a processing unit of computing device 110, or by various functional modules of computing device 110. In other embodiments, process 800 may also be implemented by a computing device independent of environment 100, or may be implemented by other units or modules in environment 100.

FIG. 9 illustrates a schematic diagram of determining set of target words 137 based on text topic correlations 910-X to 910-W between multiple words 130-X to 130-W and text topic 125 according to an embodiment of the present disclosure. For simplicity of description, some reference numerals that appear in FIG. 7 will continue to be used in FIG. 9. However, it should be noted that sharing reference numerals in FIGS. 7 and 9 does not mean that the embodiment of FIG. 9 needs to be based on the embodiment of FIG. 7. Specifically, the embodiment of FIG. 7 and the embodiment of FIG. 9 can be implemented independently of each other, or can be implemented in combination. For example, set of key words 135 depicted in FIG. 9 (for example, including K words 130-X, 130-Y, . . . , and 130-W) can be obtained by a comparison between the averages of the weight components of the weight vectors as in FIG. 7, or can be obtained based on a direct comparison between the weight values.

Referring to FIGS. 8 and 9, at block 810 of FIG. 8, computing device 110 determines a first number K of text topic correlations 910-X, 910-Y, . . . , and 910-W between a first number K of words 130-X, 130-Y, . . . , and 130-W in set of key words 135 and text topic 125, respectively. Hereinafter, for simplicity of description, text topic correlations 910-X, 910-Y, . . . , and 910-W may also be referred to as multiple text topic correlations 910 or set of text topic correlations 910. Specifically, text topic correlation 910-X is the correlation between word 130-X and text topic 125, text topic correlation 910-Y is the correlation between word 130-Y and text topic 125, . . . , and text topic correlation 910-W is the correlation between word 130-W and text topic 125.

It will be understood that computing device 110 may determine the correlation between a certain word (e.g., word 130-X) and text topic 125 in any appropriate manner. For example, computing device 110 may vectorize word 130-X into a word vector, and may vectorize text topic 125 into a text topic vector. Computing device 110 may then obtain text topic correlation 910-X between word 130-X and text topic 125 by calculating a similarity or distance between the word vector of word 130-X and the text topic vector of text topic 125. To this end, computing device 110 may employ any appropriate similarity or distance between vectors to calculate text topic correlation 910-X, including, but not limited to, Euclidean distance, Minkowski distance, Manhattan distance, Chebyshev distance, Hamming distance, Marxian distance, cosine similarity, adjusted cosine similarity, Pearson correlation coefficient, Jaccard similarity coefficient, and so on.

In addition, it should be noted that computing device 110 can vectorize text topic 125 in any suitable manner. For example, computing device 110 may use one or more topic words to represent text topic 125. Then, computing device 110 may obtain the text topic vector of text topic 125 through an appropriate operation (for example, averaging) between word vectors corresponding to the one or more topic words. In other embodiments, text topic 125 may be represented as a topic distribution with respect to multiple predetermined topics, that is, text topic 125 is a probability distribution of the multiple predetermined topics. For example, computing device 110 may use a topic model to determine the topic distribution of text topic 125. In such an embodiment, computing device 110 may determine the correlation between word 130-X and text topic 125 through the correlations between word 130-X and the multiple predetermined topics and the probability distribution of the predetermined topics. Such embodiments will be described below with reference to FIGS. 10 to 13.

Still referring to FIGS. 8 and 9, at block 820 of FIG. 8, after determining set of text topic correlations 910, computing device 110 determines, among the first number K of text topic correlations 910-X, 910-Y, . . . , and 910-W of set of text topic correlations 910, a predetermined number (L, L≤K, L being a natural number) of text topic correlations 910-U, 910-V, ..., and 910-T according to an order of their magnitudes. Hereinafter, the predetermined number L here may also be referred to as a second number L. For example, in the example of FIG. 9, computing device 110 may first rank text topic correlations 910-X, 910-Y, ..., and 910-W in an order of correlation magnitudes, thereby obtaining ordered set of text topic correlations 920. Ordered set of text topic correlations 920 still includes the first number K of text topic correlations, but the K text topic correlations are ranked according to an order of their magnitudes. That is, text topic correlation 910-U is the largest text topic correlation in set of text topic correlations 910, followed by text topic correlation 910-V, ..., and text topic correlation 910-S is the smallest text topic correlation in set of text topic correlations 910.

Then, computing device 110 can determine, among ordered set of text topic correlations 920 and in an order of text topic correlation magnitudes, ordered subset of text topic correlations 930 with the total number being L, i.e., text topic correlations 910-U, 910-V, ..., and 910-T. In the example depicted in FIG. 9, ordered subset of text topic correlations 930 includes the second number L of text topic correlations with the highest magnitude rankings in ordered set of text topic correlations 920, i.e., text topic correlation 910-U, text topic correlation 910-V, ..., and text topic correlation 910-T. In other embodiments, ordered subset of text topic correlations 930 may also be the second number L of text topic correlations with relatively high magnitude rankings in ordered set of text topic correlations 920, i.e., L relatively large text topic correlations. In addition, in such an embodiment, the magnitude rankings of the second number L of text topic correlations in ordered subset of text topic correlations 930 in ordered set of text topic correlations 920 are not necessarily continuous.

Still referring to FIGS. 8 and 9, at block 830 of FIG. 8, after determining ordered subset of text topic correlations 930, computing device 110 determines, from the first number K of words 130-X, 130-Y, ..., and 130-W of set of key words 135, the set of words corresponding to ordered subset of text topic correlations 930, i.e., the second number L of words 130-U, 130-V, ..., and 130-T corresponding to the second number L of text topic correlations 910-U, 910-V, ..., and 910-T, to serve as set of target words 137 depicted in FIG. 1. This is because, in the embodiments depicted in FIGS. 8 and 9, since words 130-U, 130-V, ..., and 130-T respectively correspond to relatively large text topic correlations 910-U, 910-V, ..., and 910-T, that is, in set of key words 135, these words are more related to text topic 125 of text 120 compared to the other words, computing device 110 can determine the second number L of words 130-U, 130-V, ..., and 130-T in set of key words 135 as set of target words 137 depicted in FIG. 1.

Through example process 800, computing device 110 can quantitatively calculate the text topic correlation between each word in set of key words 135 and text topic 125, and then can determine set of target words 137, in set of key words 135, that have relatively large correlations with text topic 125, thereby improving the reasonableness of set of target words 137 and thus enhancing the performance of information processing system 100.

As mentioned above when describing example process 800, in some embodiments, text topic 125 may be represented as a topic distribution with respect to multiple predetermined topics, that is, text topic 125 is a probability distribution of the multiple predetermined topics, respectively. For example, computing device 110 may use a topic model to determine the topic distribution of text topic 125.

In such an embodiment, computing device 110 may determine the correlation between word 130-X and text topic 125 through the correlations between word 130-X and the multiple predetermined topics and the probability distribution of the predetermined topics. Such embodiments will be described below with reference to FIGS. 10 to 13.

Figure 10:
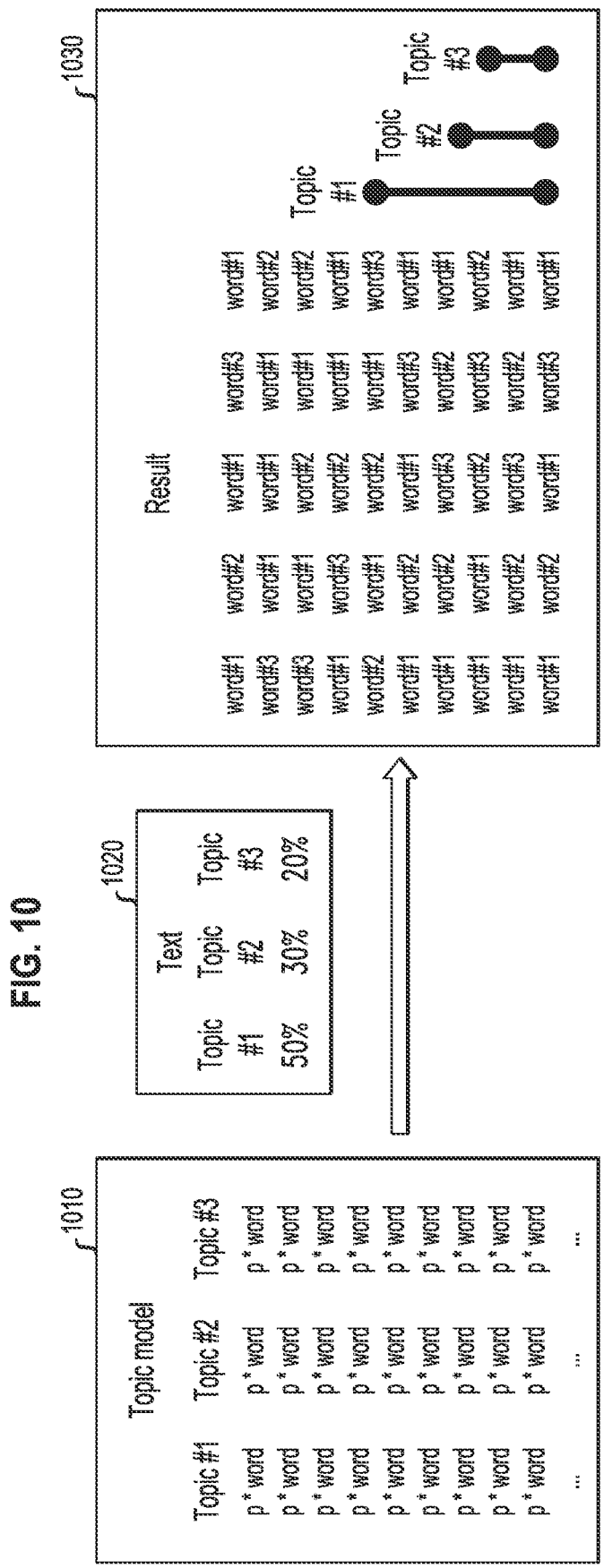
FIG. 10 illustrates a schematic diagram of determining a topic distribution of text using a topic model according to an embodiment of the present disclosure.

FIG. 10 illustrates a schematic diagram of determining text topic 1030 of text 1020 using topic model 1010 according to an embodiment of the present disclosure. In general, a topic model or topic modeling is an unsupervised machine learning technology that can scan a group of documents, detect word and phrase patterns in the documents, and automatically cluster word groups and similar expressions that characterize the set of documents. For example, Latent Dirichlet Allocation (LDA) is an example of the topic model that can be used to classify documents or text into specific topics. Specifically, the LDA model can construct topics per document model and words per topic model, and model them as a Dirichlet distribution. It should be noted that although the topic model is described in some embodiments using the LDA model as an example, this is merely schematic and is not intended to limit the scope of the present disclosure in any way. In other embodiments, the topic model herein may be any topic model known or to be developed in the future.

In the example of FIG. 10, topic model 1010 includes three predetermined topics, namely, topic #1, topic #2, and topic #3. Each predetermined topic is a distribution of words, i.e., the probability distribution of the occurrence of each word under the predetermined topic, which is represented as p*word in FIG. 10, where p denotes the probability of occurrence of a word. As further illustrated in FIG. 10, suppose that the topic distribution of text 1020 with respect to the three predetermined topics is: the probability of topic #1 being 50%, the probability of topic #2 being 30%, and the probability of topic #3 being 20%. In this case, performing topic analysis and statistics on text 1020 using topic model 1010 will result in topic distribution (i.e., result) 1030. As shown in FIG. 10, result 1030 marks which topic each word in text 1020 belongs to. For example, "word #1" denotes a word belonging to topic #1, "word #2" denotes a word belonging to topic #2, and "word #3" denotes a word belonging to topic #3. In other embodiments, words in result 1030 belonging to different topics can also be distinguished by using different colors. Also, in result 1030, column icons with different lengths can be used to visualize the relative probability magnitudes of different topics.

After explaining the basic concepts and principles of the topic model, hereinafter, the determination by computing device 110 of text topic correlation 910-X between word 130-X and text topic 125 based on the topic distribution of text topic 125 will be described below with reference to FIGS. 11 to 13. It should be noted that in the following description, word 130-X will be taken as an example to illustrate how computing device 110 obtains text topic correlation 910-X corresponding to word 130-X. However, it will be understood that for other words 130-Y, ..., and 130-W in set of key words 135, computing device 110 may use similar approaches to determine text topic correlations 910-Y, ..., and 910-W corresponding to words 130-Y, ..., and 130-W, respectively.

Figure 11:
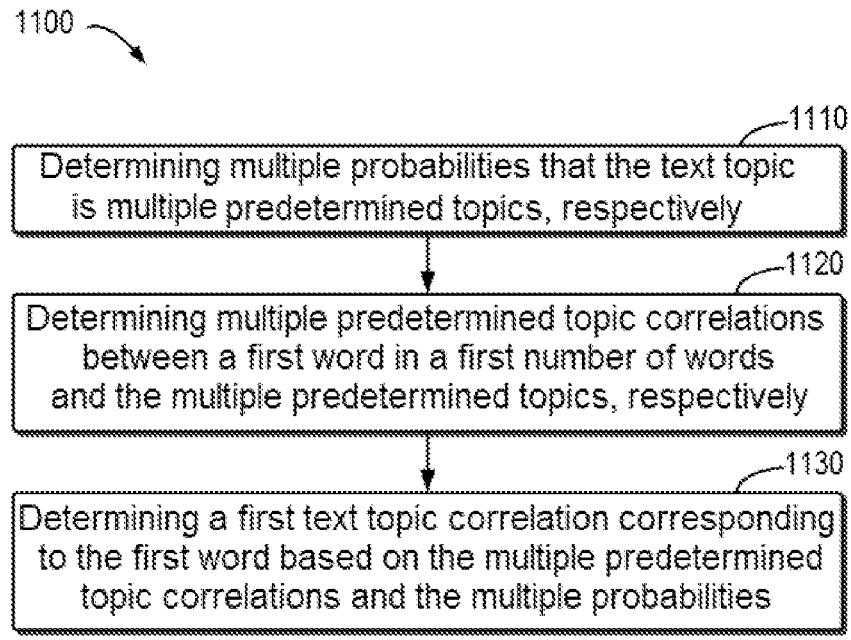
FIG. 11 illustrates a flowchart of an example process for determining a text topic correlation between a word in a set of key words and a text topic according to an embodiment of the present disclosure.

FIG. 11 illustrates a flowchart of example process 1100 for determining text topic correlation 910-X between word 130-X in set of key words 135 and text topic 125 according to an embodiment of the present disclosure. In some embodiments, process 1100 can be implemented by computing device 110 in environment 100, for example, implemented by a processor or a processing unit of computing device 110, or by various functional modules of computing device 110. In other embodiments, process 1100 may also be implemented by a computing device independent of environment 100, or may be implemented by other units or modules in environment 100.

Figure 12:
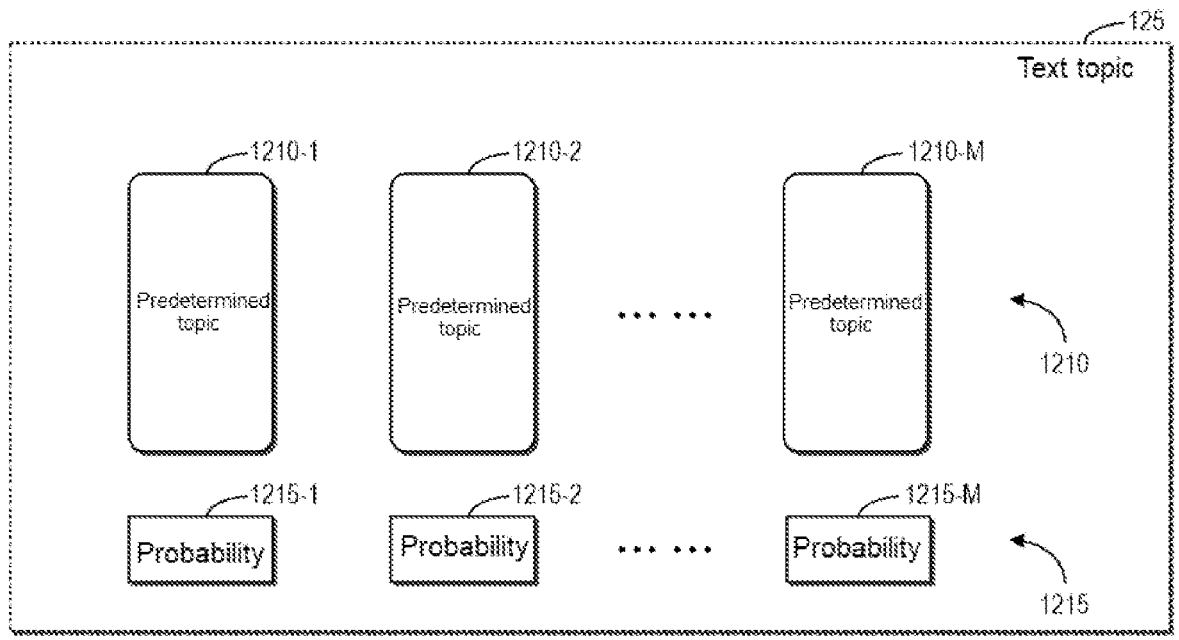
FIG. 12 illustrates a schematic diagram of representing a text topic as a topic distribution with respect to multiple predetermined topics according to an embodiment of the present disclosure.

FIG. 12 illustrates a schematic diagram of representing text topic 125 as a topic distribution with respect to predetermined topics 1210-1 to 1210-M according to an embodiment of the present disclosure. Hereinafter, for simplicity of description, predetermined topics 1210-1 to 1210-M may also be referred to collectively as multiple predetermined topics 1210 or set of predetermined topics 1210, where M is a natural number. FIG. 13 illustrates a schematic diagram of determining text topic correlation 910-X based on predetermined topic correlations 1310-1 to 1310-M between word 130-X and predetermined topics 1210-1 to 1210-M according to an embodiment of the present disclosure. Hereinafter, for simplicity of description, predetermined topic correlations 1310-1 to 1310-M may also be referred to collectively as multiple predetermined topic correlations 1310 or set of predetermined topic correlations 1310.

Referring to FIGS. 11 and 12, at block 1110 of FIG. 11, computing device 110 determines probabilities 1215-1 to 1215-M that text topic 125 is predetermined topics 1210-1 to 1210-M, respectively. Hereinafter, for simplicity of description, probabilities 1215-1 to 1215-M may also be referred to collectively as multiple probabilities 1215 or set of probabilities 1215. Therefore, in the example depicted in FIG. 12, text topic 125 of text 120 is represented by the topic distribution with respect to predetermined topics 1210-1 to 1210-M. Specifically, text topic 125 can be represented as predetermined topic 1210-1 and its corresponding probability 1215-1, predetermined topic 1210-2 and its corresponding probability 1215-2, . . . , and predetermined topic 1210-M and its corresponding probability 1215-M. For example, the topic distribution of text topic 125 with respect to set of predetermined topics 1210 can be understood as follows: the probability that text topic 125 is predetermined topic 1210-1 is 1215-1, the probability that it is predetermined topic 1210-2 is 1215-2, . . . , and the probability that it is predetermined topic 1210-M is 1215-M.

In some embodiments, computing device 110 may use a topic model (e.g., an LDA model) to determine the topic distribution of text topic 125 with respect to set of predetermined topics 1210. That is, computing device 110 may determine set of probabilities 1215 corresponding to set of predetermined topics 1210 based on the topic model for determining text topic 125. In order to make the topic model more suitable for technical scenarios of the embodiments of the present disclosure, the topic model for determining text topic 125 may be trained using the set of text associated with multiple predetermined objects 150. In this way, the topic model for determining text topic 125 can learn the topic and word distributions involved by multiple predetermined objects 150, thereby improving the effectiveness of analysis and statistics on text topic 125 of text 120 by the topic model.

Figure 13:
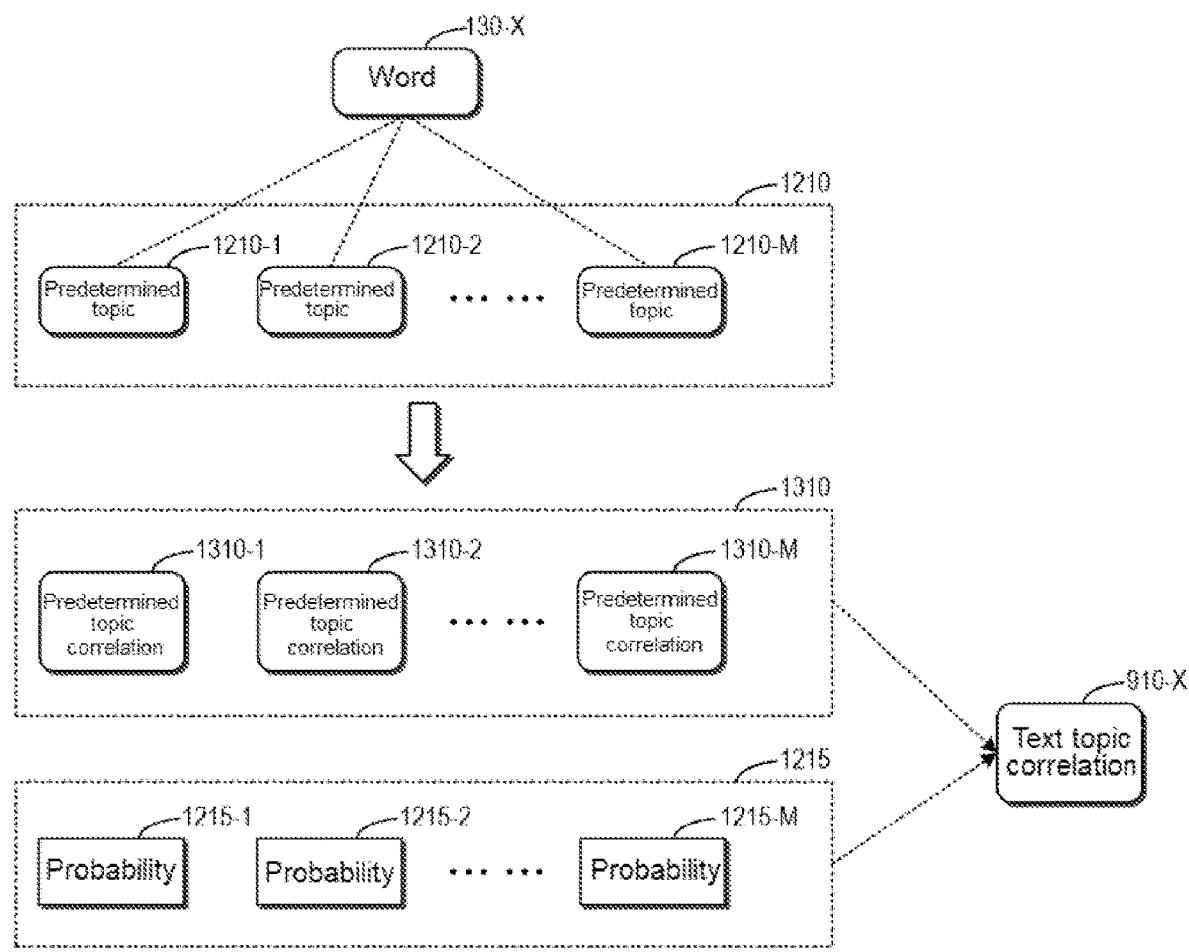
FIG. 13 illustrates a schematic diagram of determining a text topic correlation based on multiple predetermined topic correlations between a word and multiple predetermined topics according to an embodiment of the present disclosure.

Referring to FIGS. 11 and 13, at block 1120 of FIG. 11, computing device 110 determines predetermined topic correlations 1310-1 to 1310-M between word 130-X in the first number K of words 130-X, 130-Y, . . . , and 130-W and predetermined topics 1210-1 to 1210-M, respectively, i.e., set of predetermined topic correlations 1310. Specifically, predetermined topic correlation 1310-1 is the correlation between word 130-X and predetermined topic 1210-1, predetermined topic correlation 1310-2 is the correlation between word 130-X and predetermined topic 1210-2, . . . , and predetermined topic correlation 1310-M is the correlation between word 130-X and predetermined topic 1210-M.

It will be appreciated that computing device 110 may employ any appropriate manner to determine the correlation (e.g., predetermined topic correlation 1310-1) between word 130-X and a certain predetermined topic (e.g., predetermined topic 1210-1). As an example, computing device 110 may vectorize word 130-X into a word vector, and may vectorize predetermined topic 1210-1 into a predetermined topic vector. Computing device 110 may then obtain predetermined topic correlation 1310-1 between word 130-X and predetermined topic 1210-1 by calculating a similarity or distance between the word vector of word 130-X and the predetermined topic vector of predetermined topic 1210-1. To this end, computing device 110 may employ any appropriate similarity or distance between vectors to calculate predetermined topic correlation 1310-1, including, but not limited to, Euclidean distance, Minkowski distance, Manhattan distance, Chebyshev distance, Hamming distance, Marxian distance, cosine similarity, adjusted cosine similarity, Pearson correlation coefficient, Jaccard similarity coefficient, and so on.

In addition, it should be noted that computing device 110 can vectorize predetermined topic 1210-1 in any suitable manner. For example, computing device 110 can use one or more topic words to represent predetermined topic 1210-1. Then, computing device 110 may obtain a predetermined topic vector of predetermined topic 1210-1 through an appropriate operation (for example, averaging) between word vectors corresponding to the one or more topic words. In other embodiments, for example, in a case where the topic model is used to determine the topic distribution of text topic 125, predetermined topic 1210-1 may be represented as the distribution of multiple words, i.e., a probability distribution of the occurrence of the words under predetermined topic 1210-1. In such an embodiment, computing device 110 may determine the correlation between word 130-X and predetermined topic 1210-1 through the correlations between word 130-X and the multiple words of predetermined topic 1210-1 and the probability distribution of those words. Such embodiments will be described below with reference to FIGS. 14 to 16.

Still referring to FIGS. 11 and 13, at block 1130 of FIG. 11, computing device 110 determines text topic correlation 910-X corresponding to word 130-X based on predetermined topic correlations 1310-1 to 1310-M and probabilities 1215-1 to 1215-M. For example, since the multiple probabilities 1215 that text topic 125 is respectively the multiple predetermined topics 1210 vary in magnitude, in order to reflect in text topic correlation 910-X different probability magnitudes of various predetermined topics 1210-1 to 1210-M, computing device 110 may perform weighted summation on predetermined topic correlations 1310-1 to 1310-M according to respective probabilities 1215-1 to 1215-M of predetermined topics 1210-1 to 1201-M to obtain text topic correlation 910-X. It should be noted that the weighted summation operation described here is only an example approach of calculating text topic correlation 910-X, and is not intended to limit the scope of the present disclosure in any way. In other embodiments, other calculation approaches using set of predetermined topic correlations 1310 and set of probabilities 1215 are possible. For example, computing device 110 may first exclude predetermined topic correlations with probabilities lower than a threshold, then perform weighted summation on the remaining predetermined topic correlations, and so on.

Through example process 1100, computing device 110 may determine text topic correlation 910-X between word 130-X in set of key words 135 and text topic 125 based on the topic distribution of text topic 125 with respect to set of predetermined topics 1210, whereby the accuracy of text topic correlation 910-X may be improved, thereby improving the reasonableness of set of target words 137 that is output finally.

As mentioned above when describing example process 1100, in some embodiments, computing device 110 may determine the correlation between word 130-X and predetermined topic 1210-1 through the correlations between word 130-X and the multiple words of predetermined topic 1210-1 and the probability distribution of those words. Such embodiments will be described below with reference to FIGS. 14 to 16. It should be noted that in the following description, predetermined topic 1210-1 will be used as an example to illustrate how computing device 110 obtains predetermined topic correlation 1310-1 corresponding to predetermined topic 1210-1. However, it will be understood that for other predetermined topics 1210-2, . . . , and 1210-M in set of predetermined topics 1210, computing device 110 may use similar approaches to determine predetermined topic correlations 1310-2, . . . , and 1310-M respectively corresponding to predetermined topics 1210-2, . . . , and 1210-M.

Figure 14:
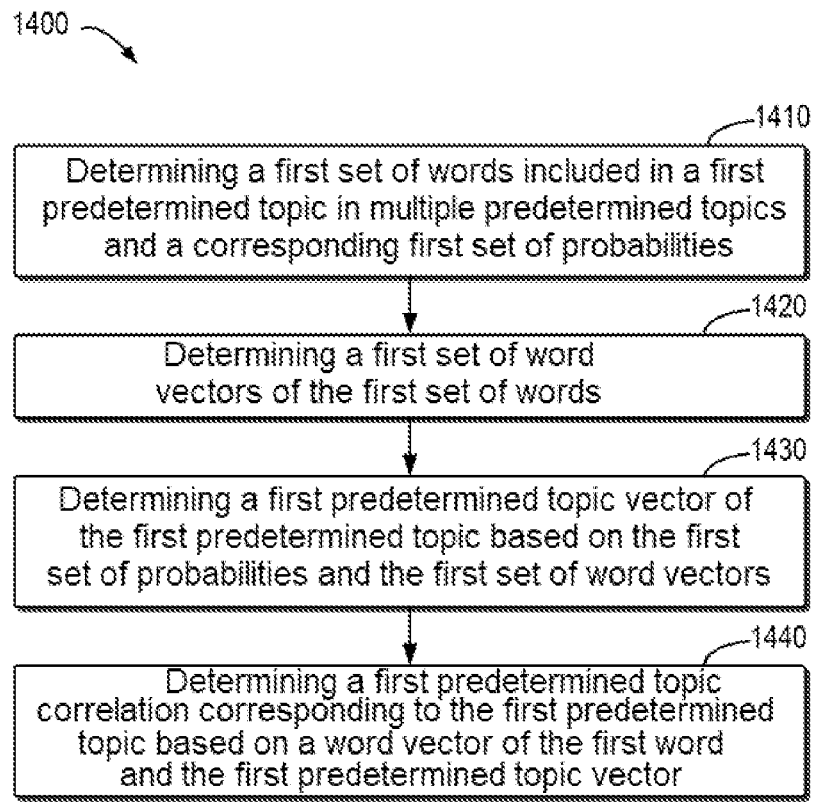
FIG. 14 illustrates a flowchart of an example process for determining a predetermined topic correlation between a word in a set of key words and a predetermined topic according to an embodiment of the present disclosure.
Figure 15:
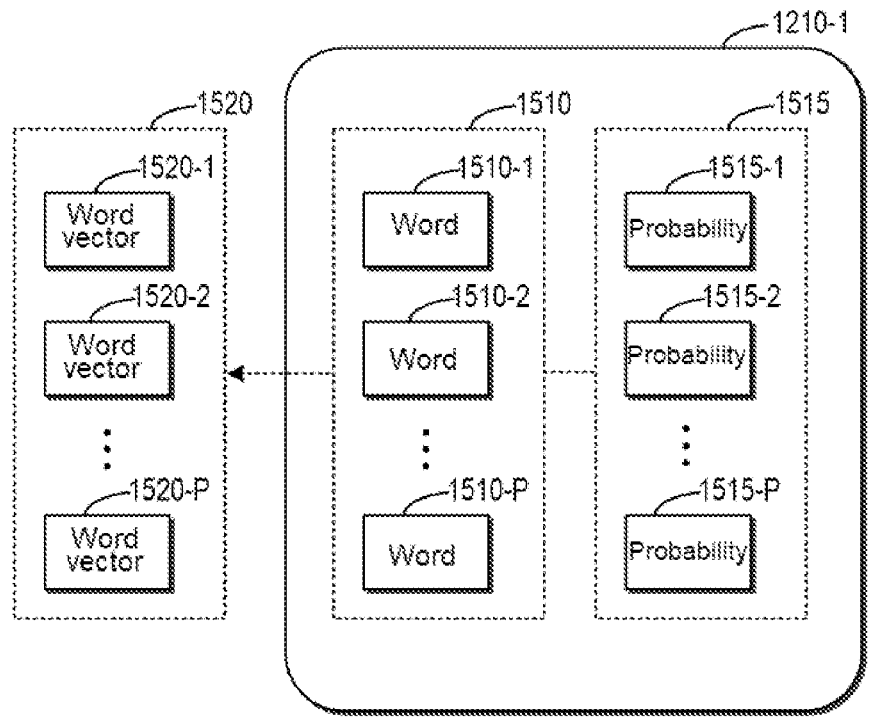
FIG. 15 illustrates a schematic diagram of a predetermined topic including a set of words and a set of probabilities, and a set of word vectors corresponding to the set of words according to an embodiment of the present disclosure.
Figure 16:
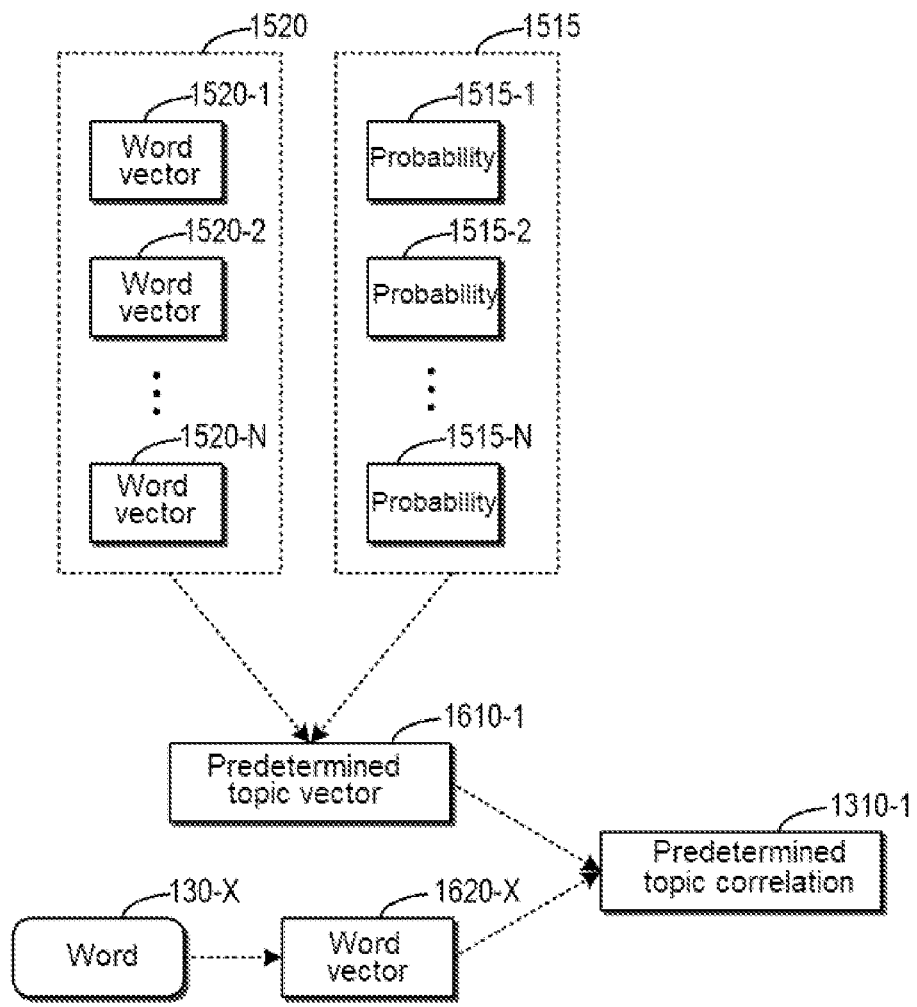
FIG. 16 illustrates a schematic diagram of determining a predetermined topic correlation based on a predetermined topic vector and a word vector according to an embodiment of the present disclosure.

FIG. 14 illustrates a flowchart of example process 1400 for determining predetermined topic correlation 1310-1 between word 130-X in set of key words 135 and predetermined topic 1210-1 according to an embodiment of the present disclosure. In some embodiments, process 1400 can be implemented by computing device 110 in environment 100, for example, implemented by a processor or a processing unit of computing device 110, or by various functional modules of computing device 110. In other embodiments, process 1400 may also be implemented by a computing device independent of environment 100, or may be implemented by other units or modules in environment 100. FIG. 15 illustrates a schematic diagram of predetermined topic 1210-1 including set of words 1510 and set of probabilities 1515, and set of word vectors 1520 corresponding to set of words 1510 according to an embodiment of the present disclosure. FIG. 16 illustrates a schematic diagram of determining predetermined topic correlation 1310-1 based on predetermined topic vector 1610-1 and word vector 1620-X according to an embodiment of the present disclosure.

Referring to FIGS. 14 and 15, at block 1410 of FIG. 14, computing device 110 determines set of words 1510 included in predetermined topics 1210-1 to 1210-M and corresponding set of probabilities 1515. That is, in the example depicted in FIG. 15, predetermined topic 1210-1 is represented by a word distribution. Specifically, predetermined topic 1210-1 can be represented as word 1510-1 and its corresponding probability 1515-1, word 1510-2 and its corresponding probability 1515-2, . . . , and word 1510-P and its corresponding probability 1515-P, where P is a natural number. It should be noted that words in set of words 1510 that is associated with predetermined topic 1210-1 are used to indicate that words of predetermined topic 1210-1, for example, as determined through the training process of the topic model, are not specifically associated with set of words 130 in text 120. The distribution of predetermined topic 1210-1 with respect to set of words 1510 can be understood as follows: the probability of occurrence of word 1510-1 under predetermined topic 1210-1 is 1515-1, the probability of occurrence of word 1510-2 is 1515-2, . . . , and the probability of occurrence of word 1510-P is 1515-P. In some embodiments, computing device 110 may use a topic model (for example, an LDA model) to determine set of words 1510 and set of probabilities 1515 of predetermined topic 1210-1.

Still referring to FIGS. 14 and 15, at block 1420 of FIG. 14, computing device 110 determines set of word vectors 1520 of set of words 1510. Specifically, computing device 110 may determine word vector 1520-1 of word 1510-1, word vector 1520-2 of word 1510-2, . . . , and word vector 1520-P of word 1510-P. It will be understood that computing device 110 may use any appropriate manner to vectorize (which may also be referred to as word embedding) words 1510-1 to 1510-P into corresponding word vectors 1520-1 to 1520-P, for example, in an artificial neural network-based manner, in a manner that reduces the dimensionality of a word co-occurrence matrix, in a probability model-based manner, in an explicit representation based on the context in which the words are located, and so on. In some embodiments, referring to FIG. 1, when text 120 is input to computing device 110, computing device 110 may perform word embedding on set of words 130 to vectorize words 130-1 to 130-N. In these embodiments, computing device 110 may vectorize set of words 1510 in the same manner as vectorizing set of words 130, e.g., using a BERT model to perform the embedding of words.

Referring to FIGS. 14 and 16, at block 1430 of FIG. 14, after determining set of word vectors 1520, computing device 110 determines predetermined topic vector 1610-1 of predetermined topic 1210-1 based on set of probabilities 1515 and set of word vectors 1520. For example, since the probabilities 1515-1 to 1515-P of the occurrence of words 1510-1 to 1510-P in predetermined topic 1210-1 vary in magnitude, in order to reflect in predetermined topic vector 1610-1 different probability magnitudes of individual words 1510-1 to 1510-P, computing device 110 may perform weighted summation on word vectors 1520-1 to 1520-P according to probabilities 1515-1 to 1515-P of words 1510-1 to 1510-P to obtain predetermined topic vector 1610-1 for representing predetermined topic 1210-1. It should be noted that the weighted summation operation described here is only an example approach of calculating predetermined topic vector 1610-1, and is not intended to limit the scope of the present disclosure in any way. In other embodiments, other calculation approaches using set of word vectors 1520 and set of probabilities 1515 are possible. For example, computing device 110 may first exclude word vectors with probabilities lower than a threshold, then perform weighted summation on the remaining word vectors, and so on.

Still referring to FIGS. 14 and 16, at block 1440 of FIG. 14, after determining predetermined topic vector 1610-1 of predetermined topic 1210-1, computing device 110 determines predetermined topic correlation 1310-1 corresponding to predetermined topic 1210-1 based on word vector 1620-X of word 130-X and predetermined topic vector 1610-1. It will be understood that computing device 110 may vectorize word 130-X into corresponding word vector 1620-X in any appropriate manner. In some embodiments, referring to FIG. 1, when text 120 is input into computing device 110, computing device 110 may perform word embedding on word 130-X to vectorize word 130-X, so as to facilitate subsequent processing on text 120. In these embodiments, computing device 110 may directly use the previous embedding result of word 130-X as word vector 1620-X in FIG. 16. In addition, it will be understood that computing device 110 may employ any appropriate similarity or distance between vectors to calculate predetermined topic correlation 1310-1, including, but not limited to, Euclidean distance, Minkowski distance, Manhattan distance, Chebyshev distance, Hamming distance, Marxian distance, cosine similarity, adjusted cosine similarity, Pearson correlation coefficient, Jaccard similarity coefficient, and so on.

Through example process 1400, computing device 110 may determine predetermined topic correlation 1310-1 between word 130-X in set of key words 135 and predetermined topic 1210-1 based on set of probabilities 1515 and set of word vectors 1520 corresponding to set of words 1510 of predetermined topic 1210-1, whereby the accuracy of predetermined topic correlation 1310-1 is improved, thereby improving the reasonableness of set of target words 137 that is output finally.

The foregoing describes the general principles and several example embodiments of the technical solution of the present disclosure. As previously mentioned, the embodiments of the present disclosure can be applied to a recommendation system. Hereinafter, applying the technical solution of the present disclosure to a service request (SR) recommendation system is taken as an example to specifically illustrate an example application of the technical solution of the present disclosure.

In companies delivering large-scale and complex information services, teams of technical support engineers will handle a high volume of customer service requests. These customer service requests may have reports of problems caused by software defects, hardware or network problems, or operational errors. How to find appropriate knowledge references that may solve service requests is a useful task in the service request classification process.

In most customer service systems of information service providers, customers can use the "Customer Service Request Tracking and Resolution Module" to submit service requests for problems encountered while using the information system, including, for example, titles (summaries) and detailed description. The automatic service request classification algorithm can be formulated as a classification problem, taking the title and description as input features and mapping them to one of the available knowledge references (classes). The main challenge is that service requests often contain a combination of free unstructured text, such as customer description, system logs, memory dump files, performance statistics information, and stack traces, which will make the input data noisy.

When providing technical support, since some junior engineers are not experienced enough, they may need relevant experience and help from senior engineers (e.g., through notes, previous solutions, etc.). In this regard, the SR recommendation system can be used to recommend relevant knowledge bases (KBs) which contain notes or previous solutions useful for solving the problem in the current service request, and so on. Therefore, the business goal of the SR recommendation system is to facilitate, by constructing a machine learning model, the process of classifying customer service requests. The machine learning model can recommend appropriate knowledge references for customer service requests to technical support engineers who handle customer service requests, so that the efficiency of junior technical support engineers can be improved based on the recommended knowledge references. However, some junior engineers may not trust the result of the recommendation system if the recommendation system does not explain why these knowledge bases are recommended to them. Therefore, a reasonable explanation about the recommendation result becomes important.

The machine learning model used in the SR recommendation system is generally an NLP-based model (for example, a BERT model). In explaining the recommendation result of the NLP model, the attention mechanism in the NLP model may be considered a starting point. In the NLP model, an attention value (or weight) can be used to represent the importance of each word, so it can be considered to use the attention value as the explanation of the recommendation result. Although efforts have been made to visualize the attention values in the NLP model, such visualizations still cannot be used directly as an explicit explanation of the recommendation result, and there is no good way to use these attention values as such explanation. In fact, there are many possible ways to explain the result of the SR recommendation system. For example, using topics as input to a classification model or using attention values, etc., but these approaches may be unreliable.

A topic model is another good NLP measurement for extracting topics from text based on the inherent nature of the text, but it is currently not commonly used in explainable artificial intelligence. However, the topic model can sometimes be used for classification tasks, and the topics in the topic model can be a kind of explanation. However, the topic model is also unreliable and may extract many meaningless words. Moreover, since the topic model is an unsupervised approach, hyperparameters like the number of topics are important for the final performance. Intuitively, the human decision-making process based on text content looks like this: first understanding the properties of the text, and then using those properties to make decisions. Therefore, attention values in the NLP model that collaborates with the topic model can be considered to model this decision-making process.

At present, explaining artificial intelligence systems in a reliable way is not an insignificant task, and many studies on this task have emerged in recent years. However, in text classification tasks, there is currently no reliable and comprehensive method for extracting explanation information. In order to make a recommendation system (e.g., an SR recommendation system) to be an explainable artificial intelligence system, it is first necessary to find ways to use attention values from the NLP model and ways to encode the topic of text analyzed by the topic model, and then it is necessary to design ways to properly model the decision-making process.

First, the extraction of explanation information for the NLP model (for example, the BERT model) is studied. For example, attention can be visualized to explain the NLP model, but this explanation is unreliable. Intuitively, each head in the NLP model should represent a perspective of the model, but some heads in the model usually have no specific meaning and cannot be described, and thus cannot serve as proper explanation information. Therefore, a good way to find useful heads in the NLP model is necessary. Then, the topic model for explanation information is studied. The topic model can be used to accomplish classification tasks, and then the topics analyzed by the topic models can be used as a form of explanation. But this is not accurate enough, and is not directly related to the prediction model. More specifically, if a user wants to obtain keywords with respect to the prediction result, then these topics are inaccurate and difficult to explain.

Next, the combined results of both the NLP model and the topic model are considered. In most people's minds, classical artificial intelligence methods that can only output results without explanation are unreliable. Therefore, a system that outputs explanation information while giving prediction results is important. When people make decisions based on text, they first try to understand the meaning of the text, and then use their knowledge and that understanding to make decisions. Therefore, in the embodiments of the present disclosure, a topic model can be used to understand the meaning of the text, while an NLP model (e.g., a BERT model) can be used to model the second step above. However, for the explanation part, it is necessary to find a good way to combine these two steps and give reliable explanation information.

Based on the above analysis and discussion, in the solution of the present disclosure, explanation information can be extracted from the trained NLP model (e.g., the BERT model) with the help of the topic model. Specifically, the NLP model can first be used to train a multi-label classification model, and then the topic model (e.g., an LDA model) can be trained. After the topic model is trained, a new combinatorial embedding (vectorization) is defined for the topics in the topic model, and then a weighted distance, also referred to be as scaled distance, between the topics in the topic model and the words in the text is calculated to determine from the input text the words that serve as explanation information. A recommendation system, such as an SR recommendation system, constructed according to an embodiment of the present disclosure will be described below with reference to FIG. 17.

Figure 17:
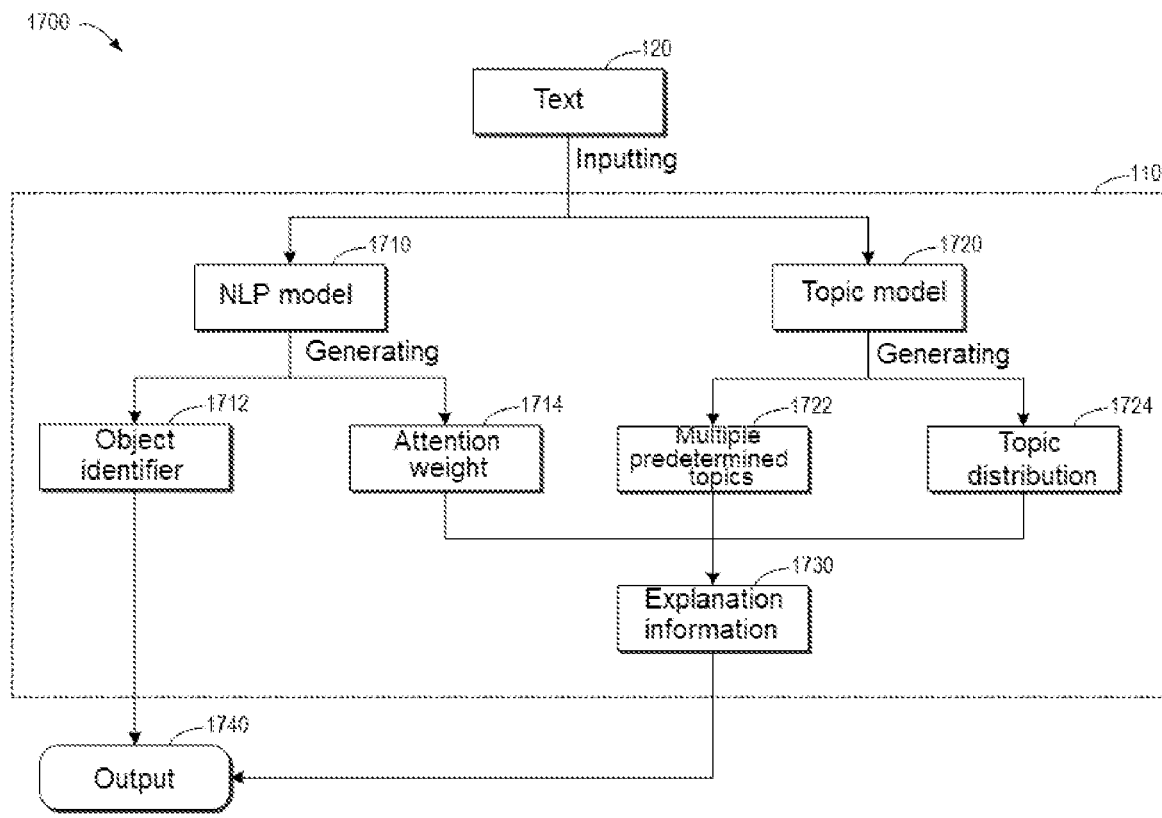
FIG. 17 illustrates a schematic framework diagram of a recommendation system that simultaneously outputs a recommended object and explanation information according to an embodiment of the present disclosure.

FIG. 17 illustrates a schematic framework diagram of recommendation system 1700 that simultaneously outputs a recommended object and explanation information according to an embodiment of the present disclosure. As shown in FIG. 17, in some embodiments, recommendation system 1700 may be implemented by computing device 110 in FIG. 1, and thus recommendation system 1700 may be understood as an example of information processing system 100 depicted in FIG. 1. However, in other embodiments, various units or modules in recommendation system 1700 may also be implemented in one or more other computing devices, or in a remote computing device, for example, a cloud computing device.

In the example of FIG. 17, text 120 may be provided to computing device 110 as the input to recommendation system 1700. NLP model (for example, BERT model) 1710 and topic model 1720 of recommendation system 1700 are trained models. Using these two models to process input text 120, recommendation system 1700 may provide object identifier 1712 of the recommended object, for example, the ID of the recommended knowledge base. In addition, recommendation system 1700 may also obtain an attention value from the NLP model (e.g., the BERT model) and with respect to each word in original text 120, multiple predetermined topics 1722 (represented as a distribution of words) of topic model 1720, and topic distribution 1724 for that original text 120. In addition to object identifier 1712, these outputs of the two models can then be used by recommendation system 1700 to generate explanation information 1730. Explanation information 1730 and object identifier 1712 are final output 1740 of recommendation system 1700.

Specifically, in one aspect, recommendation system 1700 may use NLP model 1710 to classify text 120 so as to determine, among multiple predetermined objects, an object (e.g., a recommended knowledge base) associated with text 120. In some embodiments, NLP model 1710 may be a text classification model of the BERT model. In the training of the BERT model, all layers can be unfrozen to fine-tune the whole model using specific tasks of recommendation system 1700, which will associate the attention value with the final result (class label). In recommendation system 1700, the BERT model is used in a multi-label classification task.

In other embodiments, NLP model 1710 may also be other machine learning-based NLP models that are known or to be developed in the future. Based on the understanding of the natural language in text 120, NLP model 1710 can generate object identifier 1712 and attention weights 1714. Object identifier 1712 indicates a recommended object of the recommendation system 1700 that is based on input text 120, and attention weights 1714 indicate a set of words (e.g., set of key words 135 depicted in FIG. 1) that have relatively large attention weights in the process of determining the recommended object.

In some cases, a weight in attention weights 1714 of NLP model 1710 that corresponds to a certain word may be determined based on a self-attention mechanism, for example, a weight vector that includes multiple components. However, what the user of recommendation system 1700 may want is a clear explanation, for example, of the keywords of the sentence in text 120. This means that recommendation system 1700 can make decisions, because recommendation system 1700 "sees" these keywords. In the original attention matrix of attention weights 1714 of NLP model 1710, weight information is related to the attention corresponding to each word, and recommendation system 1700 needs to find the attention corresponding to the recommended object that is output finally. Therefore, recommendation system 1700 can calculate an average of these attentions to obtain the final attention value. Then, recommendation system 1700 can retain words with the first several attention values, and these words are the original keywords (e.g., set of key words 135 depicted in FIG. 1).

On the other hand, recommendation system 1700 can use topic model 1720 to analyze the topics involved in text 120. In some embodiments, topic model 1720 may be an LDA model. Regarding the training example of topic model 1720, during the training process of the above NLP model (e.g., the BERT model), the original dataset may have more than 3000 labels, but some labels have similar topics. Therefore, 2000 can be selected as the number of topics of topic model 1720, and the LDA model can be selected as topic model 1720. In other embodiments, topic model 1720 may also be other topic models that are known or to be developed in the future. Based on statistics and analysis on the topics involved in text 120, topic model 1720 can generate multiple predetermined topics 1722 involved in text 120 and corresponding topic distribution 1724.

Then, recommendation system 1700 can determine explanation information 1730 based on attention weights 1714, multiple predetermined topics 1722, and corresponding topic distribution 1724. For example, explanation information 1730 may include set of target words 137 in text 120. Set of target words 137 includes words that are given relatively high attention weights in determining the recommended object (e.g., the recommended knowledge base) and have relatively high correlations to the topic of text 120. Specifically, topic distribution 1724 of text 120 may be a probability distribution of predetermined topics 1722, and each predetermined topic is a word distribution. Therefore, recommendation system 1700 may use this word distribution to calculate the embedding of a predetermined topic. In order to obtain the embedding for the predetermined topic, recommendation system 1700 may first obtain the word embedding of words of the predetermined topic (for example, using the BERT model). Then, recommendation system 1700 can obtain a weighted sum of these word vectors to be used as a topic vector in subsequent calculation of a weighted distance.

Next, recommendation system 1700 may calculate a weighted distance between the words in text 120 and multiple predetermined topics 1722. As pointed out above, where only the NLP model (e.g., the BERT model) is used to determine keywords, many meaningless keywords (e.g., special tokens generated during BERT inference) will be included in the set of keywords. Therefore, in the embodiments of the present disclosure, recommendation system 1700 can filter out these meaningless words using the topic vector and topic distribution of the predetermined topic.

That is, the weighted distance between the words in the text and the topic vector can be used as a filter in the embodiments of the present disclosure. Specifically, several words ranked at the top of weight averages are first converted into word embeddings, and then the weighted distance for a word (word1) is: $distance_1 = p_1 \times dis(w_1, topic_1) + \ldots + p_n \times dis(w_1, topic_n)$, where distance function dis( ) can use cosine similarity, p represents a probability of a predetermined topic, topic represents a topic vector of a predetermined topic, and w represents a word vector. This weighted distance can be a distance between the attention meaning and the topic meaning. If a word not only belongs to a topic but also has a high attention value, that word should be left as a final keyword, i.e., a keyword with the first k lowest distances (k is the number of words to be kept), of explanation information 1730.

Then, recommendation system 1700 may provide a user of recommender system 1700 with both object identifier 1712 and explanation information 1730 as outputs of recommender system 1700. Therefore, while learning an object (e.g., a knowledge base) recommended by recommendation system 1700, the user of recommendation system 1700 may also be informed of the reason why this object is recommended, thereby trusting the correctness of the recommended object more, and thus obtaining a better use experience and a higher use efficiency.

In summary, in a conventional customer service system, although a good recommendation system can be used to guide junior engineers without costing time of senior engineers and junior engineers themselves, a reasonable explanation of the recommendation result is not easy. However, conventional methods for explaining the decision-making process either are unreasonable or ignore the original recommendation model. Therefore, in embodiments of the present disclosure, a novel approach is provided to explain the classification model (for example, the BERT model) with the help of the topic model. Specifically, attention values in a machine learning model are used in an innovative averaging approach, and a new topic embedding approach is also introduced to represent the topics of the topic model. Based on these innovative approaches, a weighted distance is used to filter keywords generated using only attention values, so as to obtain more meaningful keywords.

Therefore, the new method of the present disclosure not only considers the original model (BERT) used in the recommendation system, but also considers the reliability of explanation (topic model). Specifically, the attention values are used to provide initial explanation information about why the original model gives this result, and then the topic model is used to make that explanation information more reasonable. In an example experiment, after using the topic model to eliminate some meaningless words, the explanation information becomes more reliable.

The technical advantage and technical contribution of the embodiments of the present disclosure are that a comprehensive model is firstly provided, which not only outputs the recommendation result but also outputs the explanation information. For example, in an SR recommendation system, an explanation is given while knowledge bases are recommended to the engineer. Specifically, the reason for recommending these knowledge bases can be given by showing important words in the service request. In addition, a novel algorithm that changes the way to use attention values is provided. For example, an average attention value is used to indicate the importance of each word. In addition, a novel algorithm for generating topic embedding is provided. For example, word embeddings and topic distributions are used to acquire topic embeddings (topic vectors), so as to encode topic information in a better way. Furthermore, novel combinations or novel algorithms of topic models and NLP models (for example, BERT models) are provided. This helps BERT to filter the initial confusing explanation. For example, the topics generated by the topic model are used to filter the explanation words generated using attention values. Specifically, the weighted distance between the topic vector and the word vectors generated using attentions can be used to accomplish this filtering.

Figure 18:
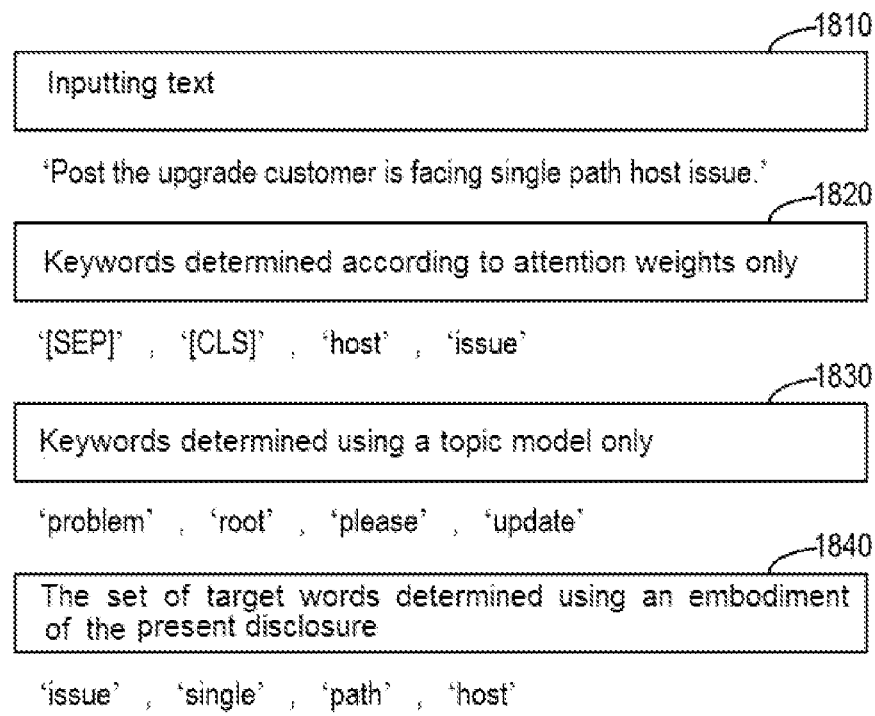
FIG. 18 illustrates a comparison between a set of target words output by the information processing method according to an embodiment of the present disclosure and keywords output by other keyword determination solutions.

FIG. 18 illustrates a comparison between a set of target words output by the information processing method according to an embodiment of the present disclosure and keywords output by other keyword determination solutions. In an example experiment in FIG. 18, input text 1810 is an English sentence "Post the upgrade customer is facing single path host issue." In the case of determining keywords according to attention weights only, four keywords 1820 with the largest attention weights are respectively "[SEP]," "[CLS]," "host," and "issue." It can be seen that the set of keywords 1820 cannot provide a good explanation of the output results because it contains even special tokens ("[CLS]," etc.) used by the NLP model for intermediate processing and other irrelevant words.

In the case of using only the topic model to determine keywords, four keywords 1830 most related to the topic of input text 1810 are respectively "problem," "root," "please," and "update." As can be seen, keywords 1830 also cannot provide a good explanation of the output results, since the words related to the topic are not clear enough to be used directly to explain why the target object is recommended and also include words that are not included in input text 1810. The set of target words 1840 determined using the embodiments of the present disclosure includes words "issue," "single," "path," and "host," wherein this set of target words are clearer and easier to understand than results of other keyword determination solutions. Therefore, the results of this example experiment clearly illustrate the advantages of the combinatorial solution of the present disclosure in terms of the explanation function of the target object.

Figure 19:
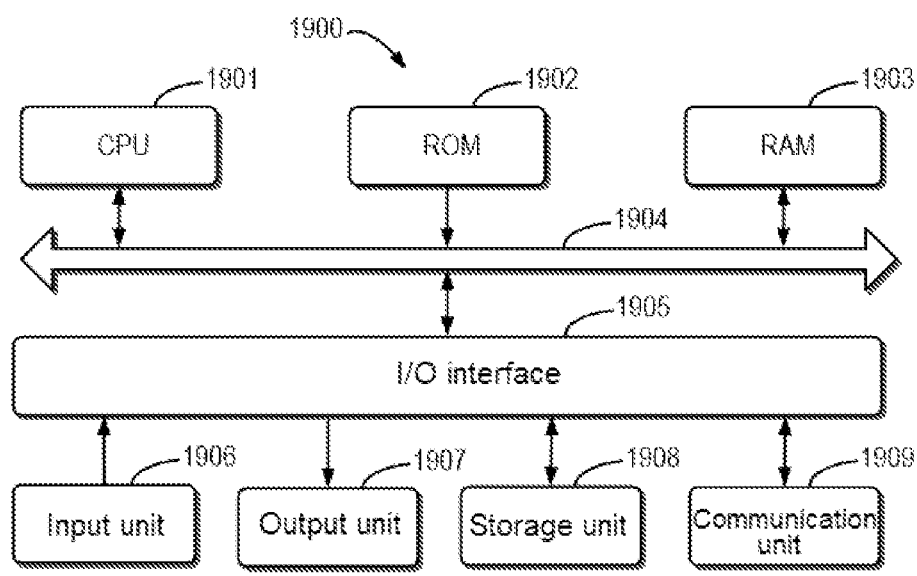
FIG. 19 illustrates a block diagram of an example device that can be used to implement an embodiment of the present disclosure.

FIG. 19 illustrates a block diagram of example device 1900 that can be used to implement an embodiment of the present disclosure. In some embodiments, device 1900 may be an electronic device that can be used to implement computing device 110 in FIG. 1. As shown in FIG. 19, device 1900 includes central processing unit (CPU) 1901 that may perform various appropriate actions and processing according to computer program instructions stored in read-only memory device (ROM) 1902 or computer program instructions loaded from storage unit 1908 into random access memory device (RAM) 1903. In RAM 1903, various programs and data required for the operation of storage device 1900 may also be stored. CPU 1901, ROM 1902, and RAM 1903 are connected to each other through bus 1904. Input/output (I/O) interface 1905 is also connected to bus 1904.

Multiple components in device 1900 are connected to I/O interface 1905, including: input unit 1906, such as a keyboard and a mouse; output unit 1907, such as various types of displays and speakers; storage unit 1908, such as a magnetic disk and an optical disk; and communication unit 1909, such as a network card, a modem, and a wireless communication transceiver. Communication unit 1909 allows device 1900 to exchange information/data with other devices via a computer network such as the Internet and/or various telecommunication networks.

The various processes and processing described above, such as example methods or example processes, may be performed by CPU 1901. For example, in some embodiments, various example methods or example processes may be implemented as a computer software program that is tangibly contained in a machine-readable medium such as storage unit 1908. In some embodiments, part or all of the computer program may be loaded into and/or installed onto device 1900 via ROM 1902 and/or communication unit 1909. When the computer program is loaded into RAM 1903 and executed by CPU 1901, one or more steps of the example method or example process described above may be executed.

As used herein, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or the same objects. Other explicit and implicit definitions may also be included below.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flowcharts can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

What is claimed is:

1. An information processing method, including:
receiving text comprising a service request from a user of a storage system;
determining, utilizing a first machine learning model of a processor-implemented machine learning system, and based on multiple weights corresponding to multiple words in the text, a target object associated with the text among predetermined multiple objects, and a set of key words among the multiple words and with respect to the determination of the target object;
determining, utilizing a second machine learning model of the processor-implemented machine learning system, and among the set of key words, a set of target words related to a text topic of the text;
outputting, by the processor-implemented machine learning system, the set of target words and an identifier of the target object in an associated manner, wherein outputting the set of target words and the identifier of the target object comprises generating at least one visualization in which the set of target words is associated with the identifier of the target object in a visually perceptible manner;
processing the outputted set of target words and the identifier of the target object to generate a corresponding recommendation;
sending the recommendation to the user as at least a portion of a service response configured to address the service request in the text; and
implementing one or more actions relating to the storage system to address the service request in the text based on the recommendation;
wherein the first machine learning model of the processor-implemented machine learning system comprises a trained text classification model for natural language processing;
wherein the second machine learning model of the processor-implemented machine learning system comprises a topic model;
wherein determining the set of target words utilizing the second machine learning model includes:
determining a first number of text topic correlations between a first number of words in the set of key words and the text topic, respectively;
determining, among the first number of text topic correlations, a second number of text topic correlations according to an order of their magnitudes; and
determining, from the first number of words, a second number of words corresponding to the second number of text topic correlations;
wherein the multiple weights include a first weight of a first word in the multiple words, and the first weight includes multiple first weight components that are determined based on multiple word correlations between the multiple words and the first word, respectively; and wherein generating the at least one visualization further comprises generating visual representations of respective ones of the multiple word correlations.

2. The method according to claim 1, wherein determining the set of key words includes:
- determining multiple weight averages respectively corresponding to the multiple weights, each weight average being determined based on multiple weight components of a corresponding weight;
- determining, among the multiple weight averages, a first number of weight averages according to an order of their magnitudes; and
- determining, from the multiple words, a first number of words corresponding to the first number of weight averages.

3. The method according to claim 1, wherein determining the first number of text topic correlations includes:
- determining multiple probabilities that the text topic is multiple predetermined topics, respectively;
- determining multiple predetermined topic correlations between a first word in the first number of words and the multiple predetermined topics, respectively; and
- determining a first text topic correlation corresponding to the first word based on the multiple predetermined topic correlations and the multiple probabilities.

4. The method according to claim 3, wherein determining the multiple predetermined topic correlations includes:
- determining a first set of words included in a first predetermined topic in the multiple predetermined topics and a corresponding first set of probabilities;
- determining a first set of word vectors of the first set of words;
- determining a first predetermined topic vector of the first predetermined topic based on the first set of probabilities and the first set of word vectors; and
- determining a first predetermined topic correlation corresponding to the first predetermined topic based on a word vector of the first word and the first predetermined topic vector.

5. The method according to claim 3, wherein determining the multiple probabilities includes:
- determining the multiple probabilities based on the topic model for determining the text topic, wherein the topic model is trained using a set of text associated with the multiple predetermined objects.

6. The method according to claim 1, wherein outputting the set of target words includes:
- outputting the set of target words as explanation information about the association between the text and the target object.

7. The method according to claim 1, wherein the text is a description text about a failure of the storage system, and the multiple predetermined objects are predetermined multiple knowledge bases, the multiple knowledge bases including different sets of text associated with solving different types of failures of the storage system.

8. An electronic device, including:
- at least one processor; and
- at least one memory storing computer program instructions, wherein the at least one memory and the computer program instructions are configured to cause, along with the at least one processor, the electronic device to:
- receive text comprising a service request from a user of a storage system;
- determine, utilizing a first machine learning model of a processor-implemented machine learning system, and based on multiple weights corresponding to multiple words in the text, a target object associated with the text among predetermined multiple objects, and a set of key words among the multiple words and with respect to the determination of the target object;
- determine, utilizing a second machine learning model of the processor-implemented machine learning system, and among the set of key words, a set of target words related to a text topic of the text;
- output, by the processor-implemented machine learning system, the set of target words and an identifier of the target object in an associated manner, wherein outputting the set of target words and the identifier of the target object comprises generating at least one visualization in which the set of target words is associated with the identifier of the target object in a visually perceptible manner;
- process the outputted set of target words and the identifier of the target object to generate a corresponding recommendation;
- send the recommendation to the user as at least a portion of a service response configured to address the service request in the text; and
- implement one or more actions relating to the storage system to address the service request in the text based on the recommendation;
- wherein the first machine learning model of the processor-implemented machine learning system comprises a trained text classification model for natural language processing;
- wherein the second machine learning model of the processor-implemented machine learning system comprises a topic model;
- wherein determining the set of target words includes:
- determining a first number of text topic correlations between a first number of words in the set of key words and the text topic, respectively;
- determining, among the first number of text topic correlations, a second number of text topic correlations according to an order of their magnitudes; and
- determining, from the first number of words, a second number of words corresponding to the second number of text topic correlations;
- wherein the multiple weights include a first weight of a first word in the multiple words, and the first weight includes multiple first weight components that are determined based on multiple word correlations between the multiple words and the first word, respectively; and
- wherein generating the at least one visualization further comprises generating visual representations of respective ones of the multiple word correlations.

9. The electronic device according to claim 8, wherein the at least one memory and the computer program instructions are configured to cause, along with the at least one processor, the electronic device to determine the set of key words by:
- determining multiple weight averages respectively corresponding to the multiple weights, each weight average being determined based on multiple weight components of a corresponding weight;
- determining, among the multiple weight averages, a first number of weight averages according to an order of their magnitudes; and
- determining, from the multiple words, a first number of words corresponding to the first number of weight averages.

10. The electronic device according to claim 8, wherein the at least one memory and the computer program instructions are configured to cause, along with the at least one processor, the electronic device to determine the first number of text topic correlations by:
  determining multiple probabilities that the text topic is multiple predetermined topics, respectively;
  determining multiple predetermined topic correlations between a first word in the first number of words and the multiple predetermined topics, respectively; and
  determining a first text topic correlation corresponding to the first word based on the multiple predetermined topic correlations and the multiple probabilities.

11. The electronic device according to claim 10, wherein the at least one memory and the computer program instructions are configured to cause, along with the at least one processor, the electronic device to determine the multiple predetermined topic correlations by:
  determining a first set of words included in a first predetermined topic in the multiple predetermined topics and a corresponding first set of probabilities;
  determining a first set of word vectors of the first set of words;
  determining a first predetermined topic vector of the first predetermined topic based on the first set of probabilities and the first set of word vectors; and
  determining a first predetermined topic correlation corresponding to the first predetermined topic based on a word vector of the first word and the first predetermined topic vector.

12. The electronic device according to claim 10, wherein the at least one memory and the computer program instructions are configured to cause, along with the at least one processor, the electronic device to determine the multiple probabilities by:
  determining the multiple probabilities based on the topic model for determining the text topic, wherein the topic model is trained using a set of text associated with the multiple predetermined objects.

13. The electronic device according to claim 8, wherein the at least one memory and the computer program instructions are configured to cause, along with the at least one processor, the electronic device to output the set of target words by:
  outputting the set of target words as explanation information about the association between the text and the target object.

14. A computer program product tangibly stored on a non-transitory computer-readable medium and including machine-executable instructions, wherein the machine-executable instructions, when executed, cause a machine to perform steps of an information processing method, the method including:
  receiving text comprising a service request from a user of a storage system;
  determining, utilizing a first machine learning model of a processor-implemented machine learning system, and based on multiple weights corresponding to multiple words in the text, a target object associated with the text among predetermined multiple objects, and a set of key words among the multiple words and with respect to the determination of the target object;
  determining, utilizing a second machine learning model of the processor-implemented machine learning system, and among the set of key words, a set of target words related to a text topic of the text;
  outputting, by the processor-implemented machine learning system, the set of target words and an identifier of the target object in an associated manner, wherein outputting the set of target words and the identifier of the target object comprises generating at least one visualization in which the set of target words is associated with the identifier of the target object in a visually perceptible manner;
  processing the outputted set of target words and the identifier of the target object to generate a corresponding recommendation;
  sending the recommendation to the user as at least a portion of a service response configured to address the service request in the text; and
  implementing one or more actions relating to the storage system to address the service request in the text based on the recommendation;
  wherein the first machine learning model of the processor-implemented machine learning system comprises a trained text classification model for natural language processing;
  wherein the second machine learning model of the processor-implemented machine learning system comprises a topic model;
  wherein determining the set of target words includes:
  determining a first number of text topic correlations between a first number of words in the set of key words and the text topic, respectively;
  determining, among the first number of text topic correlations, a second number of text topic correlations according to an order of their magnitudes; and
  determining, from the first number of words, a second number of words corresponding to the second number of text topic correlations;
  wherein the multiple weights include a first weight of a first word in the multiple words, and the first weight includes multiple first weight components that are determined based on multiple word correlations between the multiple words and the first word, respectively; and
  wherein generating the at least one visualization further comprises generating visual representations of respective ones of the multiple word correlations.

15. The computer program product according to claim 14, wherein determining the first number of text topic correlations includes:
  determining multiple probabilities that the text topic is multiple predetermined topics, respectively;
  determining multiple predetermined topic correlations between a first word in the first number of words and the multiple predetermined topics, respectively; and
  determining a first text topic correlation corresponding to the first word based on the multiple predetermined topic correlations and the multiple probabilities.

16. The computer program product according to claim 15, wherein determining the multiple predetermined topic correlations includes:
  determining a first set of words included in a first predetermined topic in the multiple predetermined topics and a corresponding first set of probabilities;
  determining a first set of word vectors of the first set of words;
  determining a first predetermined topic vector of the first predetermined topic based on the first set of probabilities and the first set of word vectors; and determining a first predetermined topic correlation corresponding to the first predetermined topic based on a word vector of the first word and the first predetermined topic vector.

17. The computer program product according to claim 15, wherein determining the multiple probabilities includes:
determining the multiple probabilities based on the topic model for determining the text topic, wherein the topic model is trained using a set of text associated with the multiple predetermined objects.

18. The computer program product according to claim 14, wherein outputting the set of target words includes:
outputting the set of target words as explanation information about the association between the text and the target object.

19. The computer program product according to claim 14, wherein determining the set of key words includes:

determining multiple weight averages respectively corresponding to the multiple weights, each weight average being determined based on multiple weight components of a corresponding weight;
determining, among the multiple weight averages, a first number of weight averages according to an order of their magnitudes; and
determining, from the multiple words, a first number of words corresponding to the first number of weight averages.

20. The computer program product according to claim 14, wherein the text is a description text about a failure of the storage system, and the multiple predetermined objects are predetermined multiple knowledge bases, the multiple knowledge bases including different sets of text associated with solving different types of failures of the storage system.

* * * * *